US011359678B2

(12) United States Patent
Nishikawa et al.

(10) Patent No.: US 11,359,678 B2
(45) Date of Patent: Jun. 14, 2022

(54) POWER TRANSMISSION DEVICE

(71) Applicant: Kabushiki Kaisha F.C.C., Hamamatsu (JP)

(72) Inventors: Junichi Nishikawa, Hamamatsu (JP); Katsu Yoshimoto, Hamamatsu (JP); Han Hiong Chen, Hamamatsu (JP); Yoshihiko Ozawa, Hamamatsu (JP)

(73) Assignee: Kabushiki Kaisha F.C.C., Hamamatsu (JP)

( * ) Notice: Subject to any disclaimer, the term of this patent is extended or adjusted under 35 U.S.C. 154(b) by 0 days.

(21) Appl. No.: 16/925,724

(22) Filed: Jul. 10, 2020

(65) Prior Publication Data

US 2020/0340536 A1   Oct. 29, 2020

Related U.S. Application Data

(63) Continuation of application No. PCT/JP2019/000381, filed on Jan. 9, 2019.

(30) Foreign Application Priority Data

Jan. 11, 2018   (JP) .............................. JP2018-002702

(51) Int. Cl.
   *F16D 13/52*   (2006.01)
   *F16D 23/12*   (2006.01)
(52) U.S. Cl.
   CPC ............. *F16D 13/52* (2013.01); *F16D 23/12* (2013.01); *F16D 2023/123* (2013.01)
(58) Field of Classification Search
   CPC ........ F16D 13/52–2013/565; F16D 43/00–30; F16D 23/12–2023/123
   See application file for complete search history.

(56) References Cited

U.S. PATENT DOCUMENTS

| | | | |
|---|---|---|---|
| 10,247,260 B2* | 4/2019 | Kataoka | .................. F16D 13/02 |
| 10,670,087 B2* | 6/2020 | Kataoka | .................. F16D 13/52 |
| 2017/0184156 A1* | 6/2017 | Kataoka | .................. F16D 23/12 |
| 2019/0226532 A1* | 7/2019 | Kataoka | .................. F16D 43/21 |

(Continued)

FOREIGN PATENT DOCUMENTS

| | | |
|---|---|---|
| CN | 104011416 A | 8/2014 |
| CN | 106715944 A | 5/2017 |
| JP | H05-202963 A | 8/1993 |

(Continued)

OTHER PUBLICATIONS

International Search Report in corresponding PCT Application No. PCT/JP2019/000381 dated Apr. 16, 2019.

(Continued)

*Primary Examiner* — David R Morris

(74) *Attorney, Agent, or Firm* — Harness, Dickey & Pierce, P.L.C.

(57) ABSTRACT

A power transmission device has a pressure member 5, drive-side clutch plates, driven-side clutch plates, a clutch spring 10, a separate receiving member 11, and a back-torque limiting cam. A radially-outside restricting portion restricts radially-outward movement of the receiving member 11 relative to the pressure member 5. This maintains clearance t between a side surface 11*d* of the receiving member 11 and an inner peripheral wall 4*e* of a clutch member 4.

8 Claims, 21 Drawing Sheets

(56) References Cited

U.S. PATENT DOCUMENTS

2020/0340537 A1* 10/2020 Nishikawa .............. F16D 23/12

FOREIGN PATENT DOCUMENTS

| JP | 2010-053988 A | 3/2010 |
| JP | 2011-153655 A | 8/2011 |
| JP | 2011-190885 A | 9/2011 |
| WO | WO-2016-024557 A1 | 2/2016 |

OTHER PUBLICATIONS

Supplementary European Search Report dated Sep. 16, 2021 in corresponding European Application No. 19738657.6.

* cited by examiner

[Fig. 1]
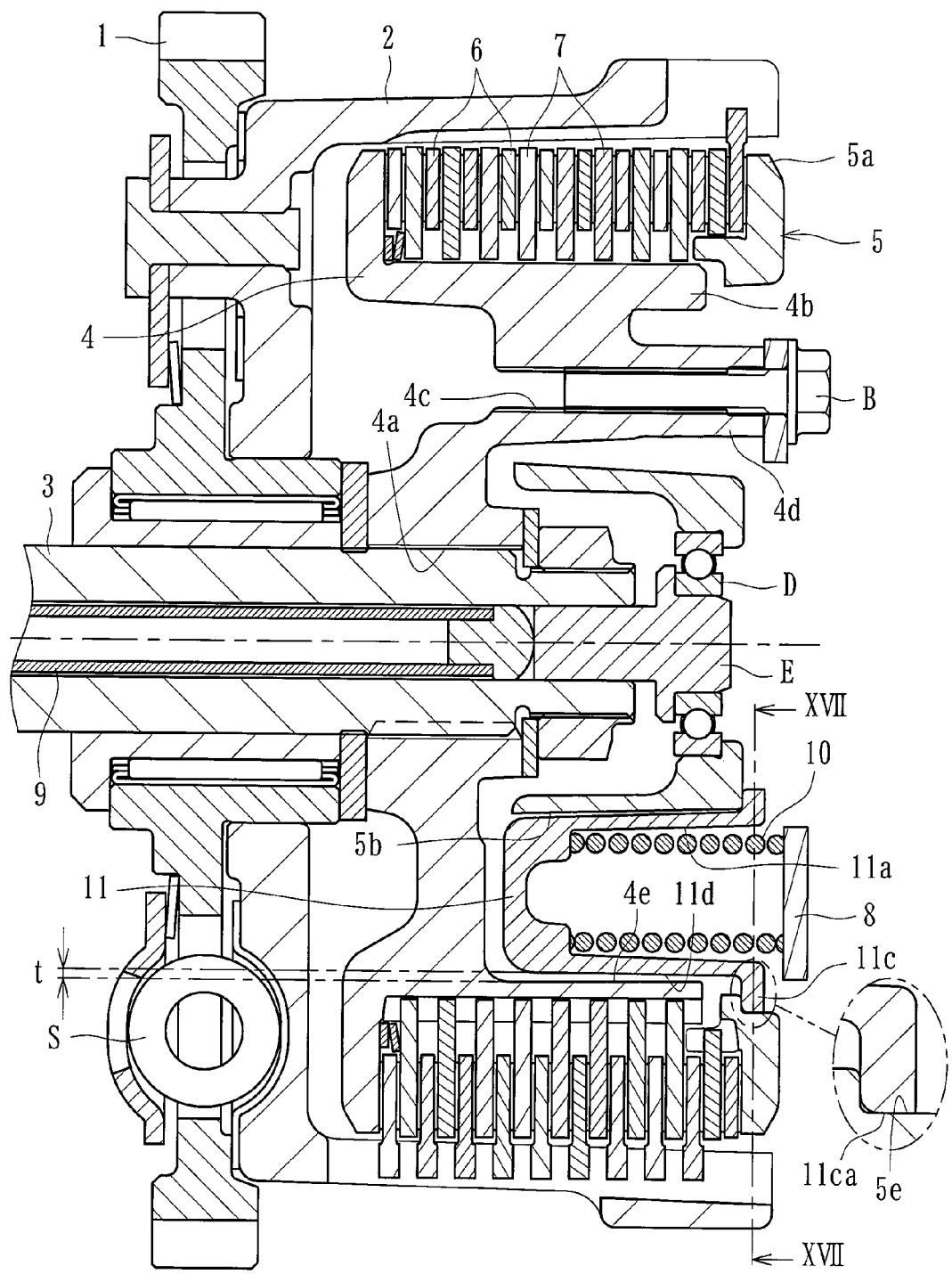

[Fig. 2]
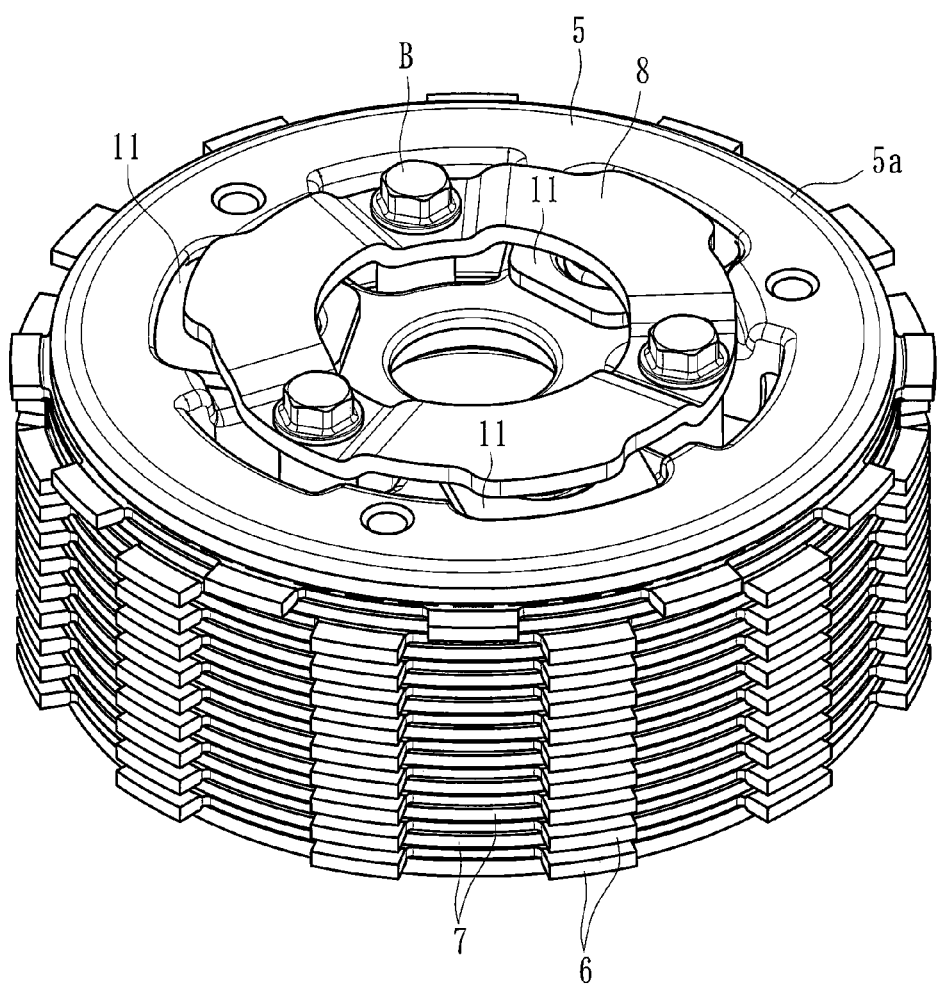

[Fig. 3]
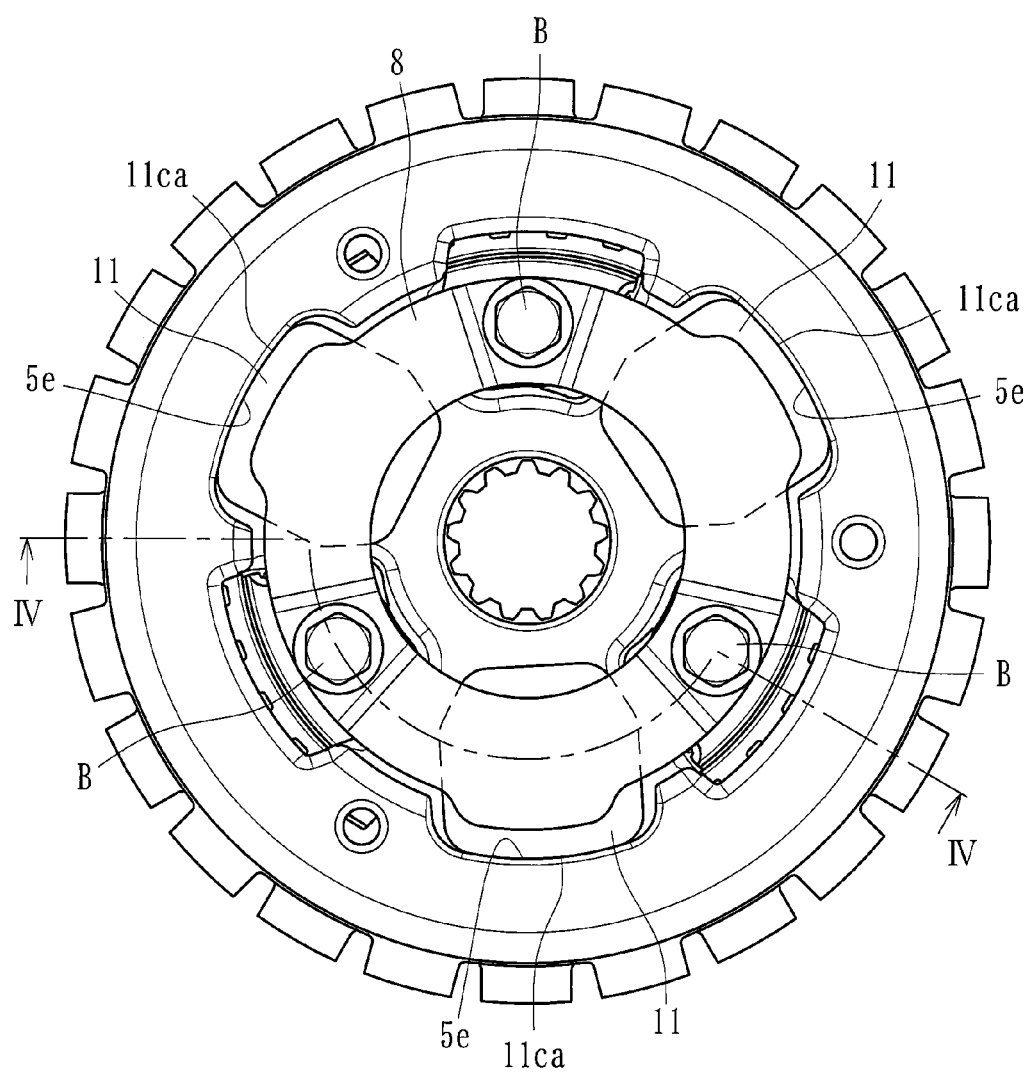

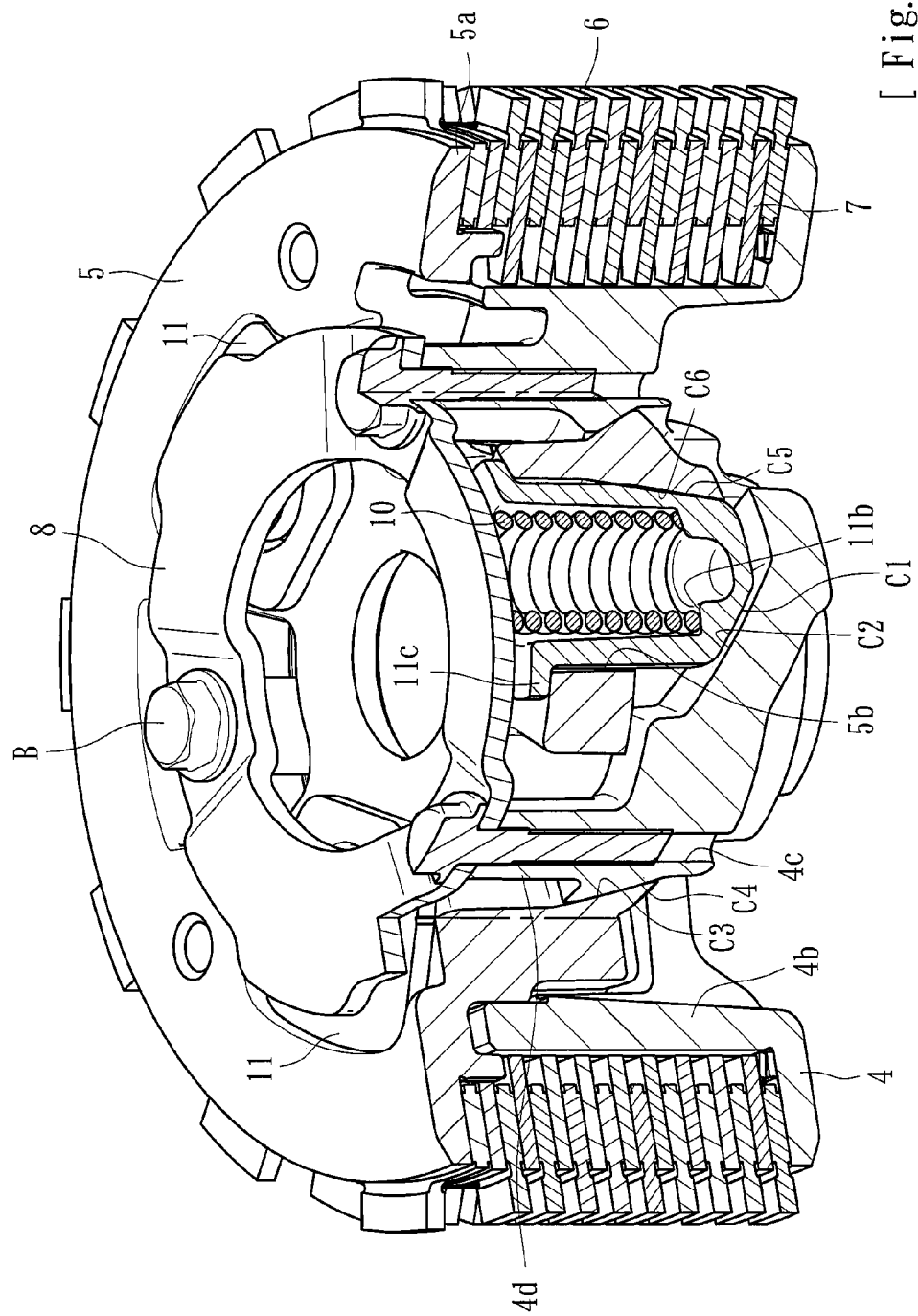
[Fig. 4]

[Fig. 5]
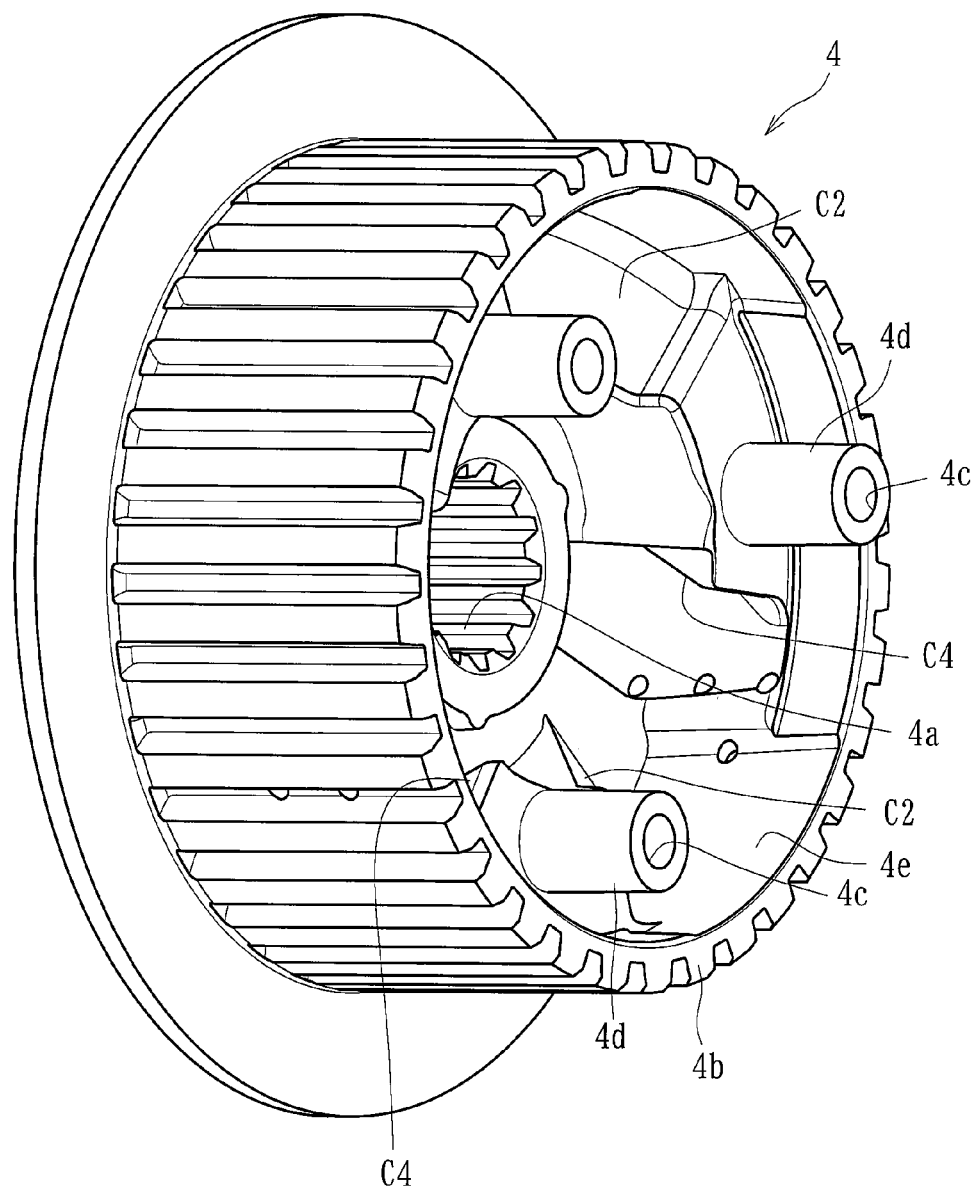

[ Fig. 6 ]
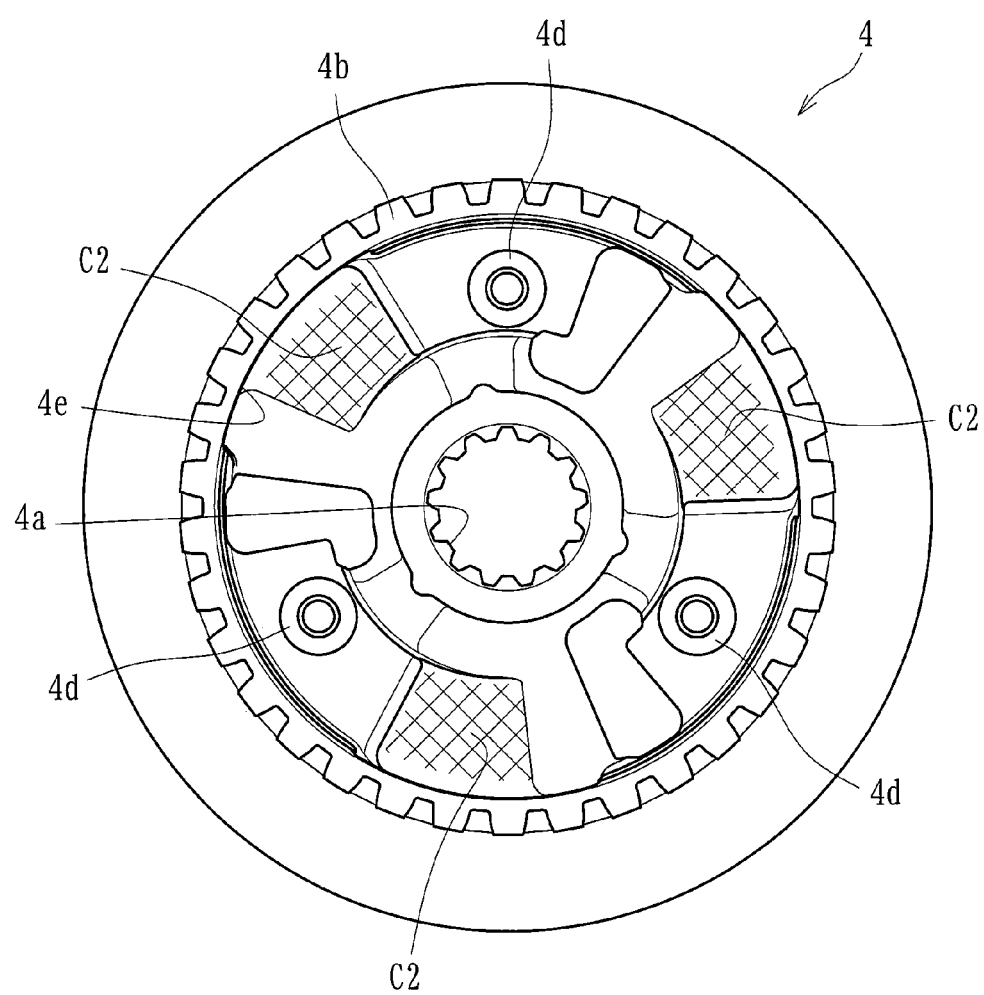

[ Fig. 7 ]
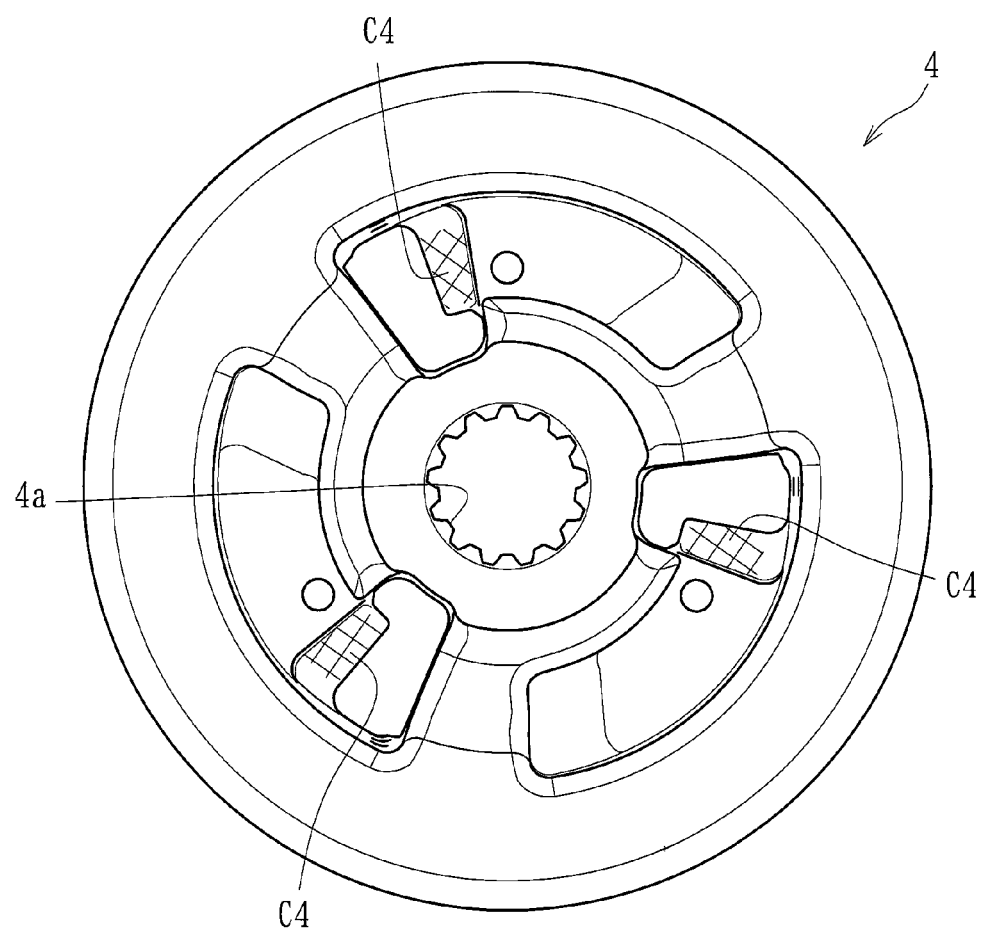

[Fig. 8]
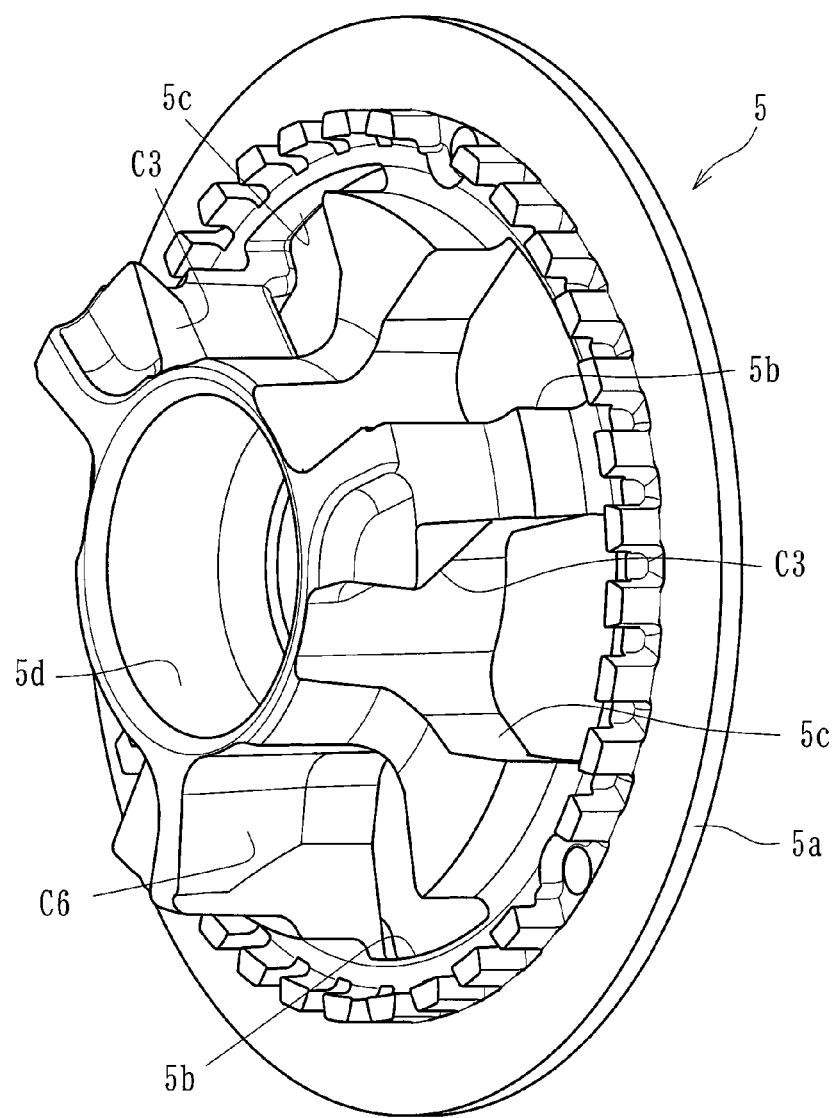

[Fig. 9]
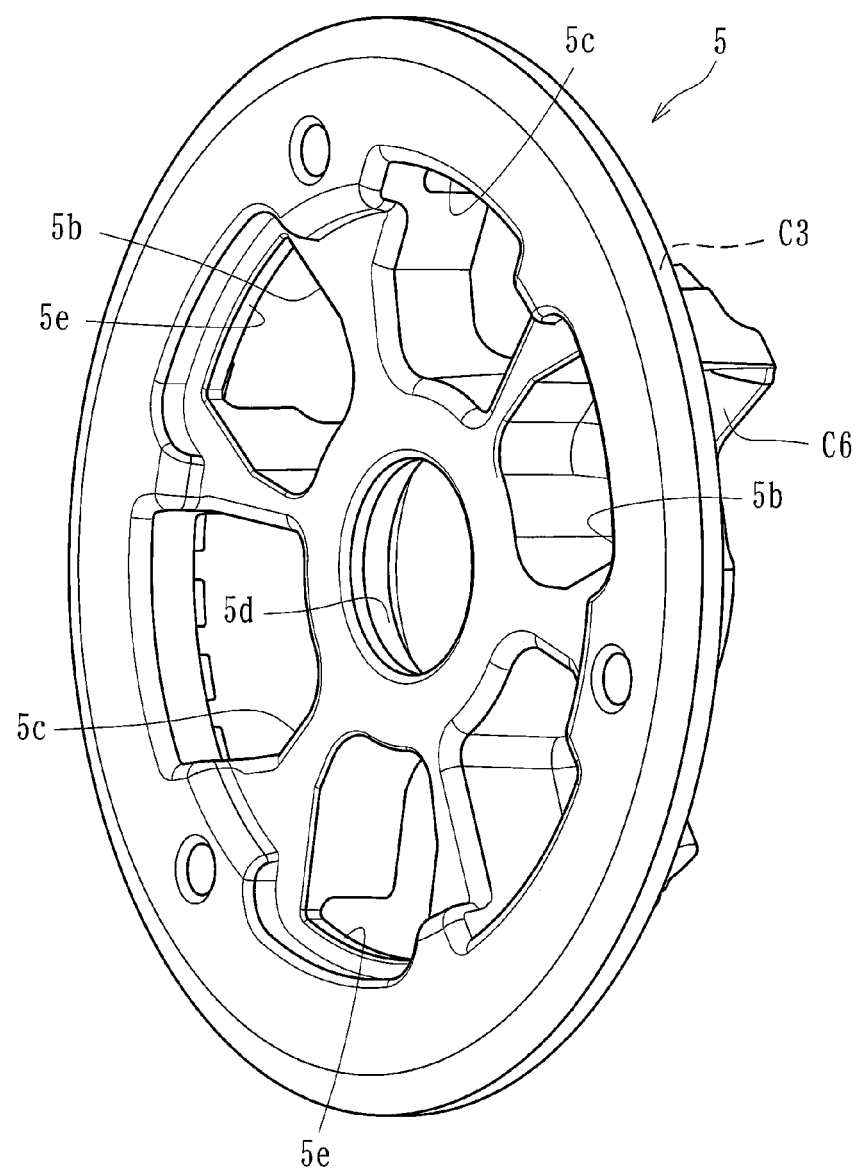

[Fig. 10]
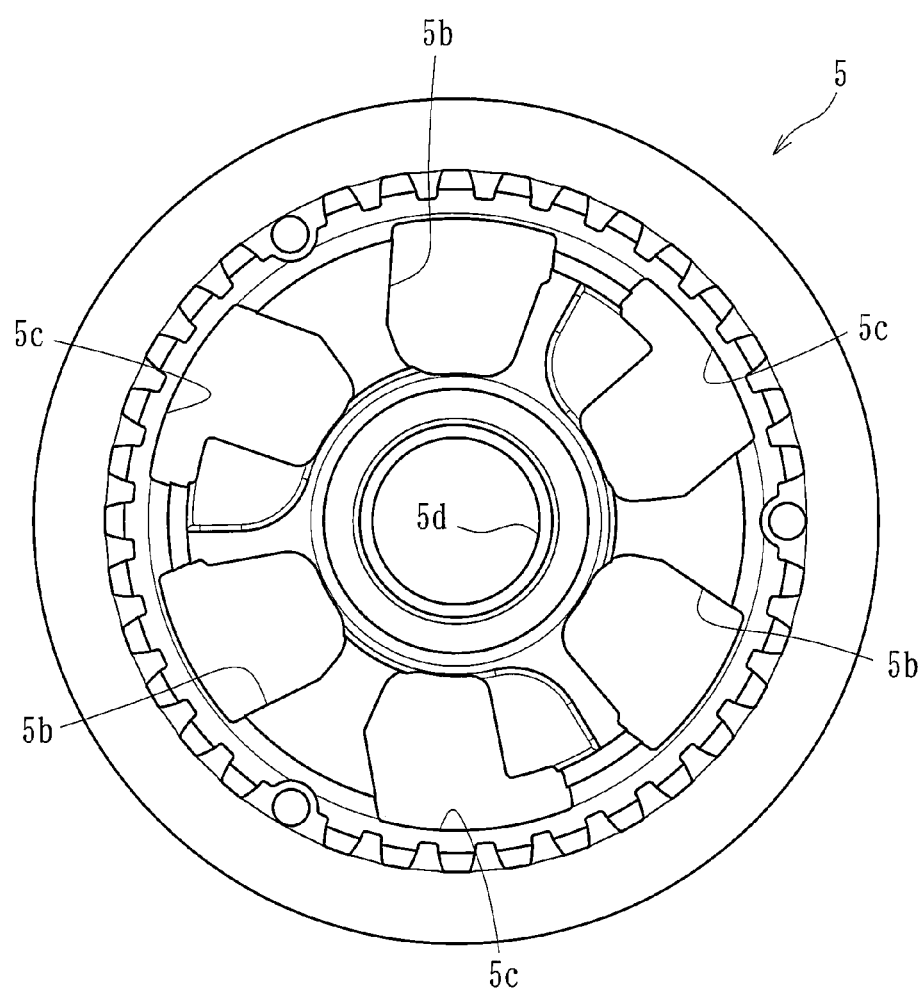

[ Fig. 11 ]
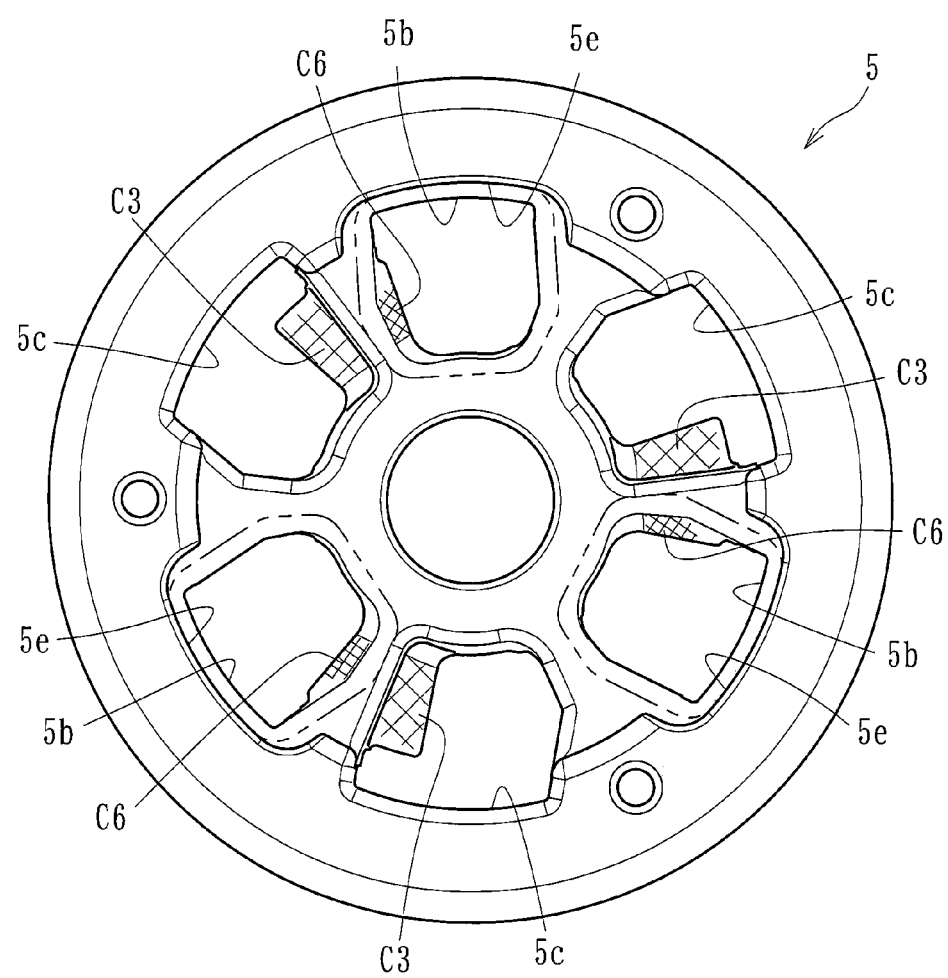

[ Fig. 12 ]
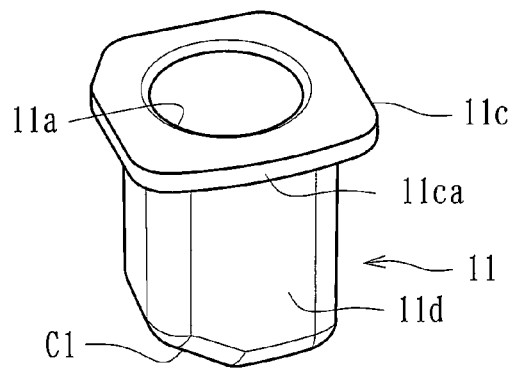
[ Fig. 13 ]
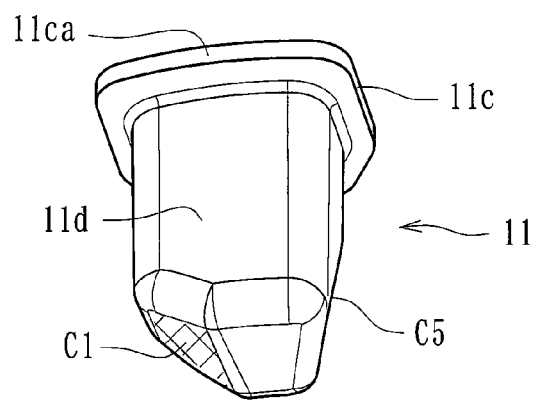
[ Fig. 14 ]
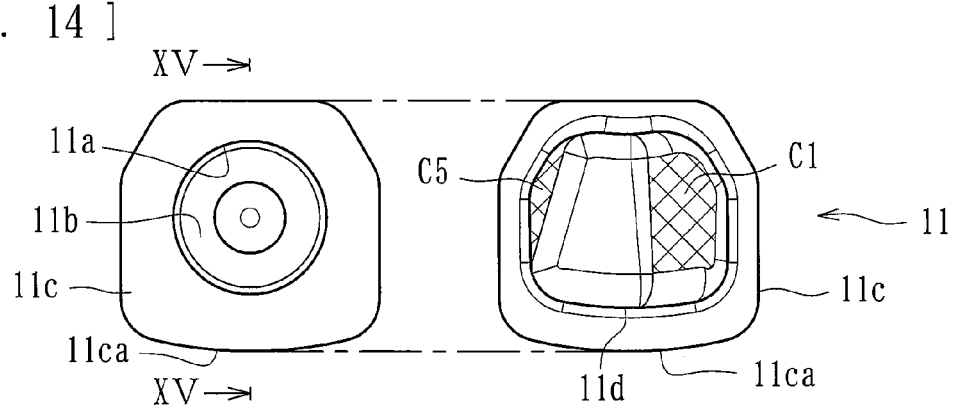
[ Fig. 15 ]
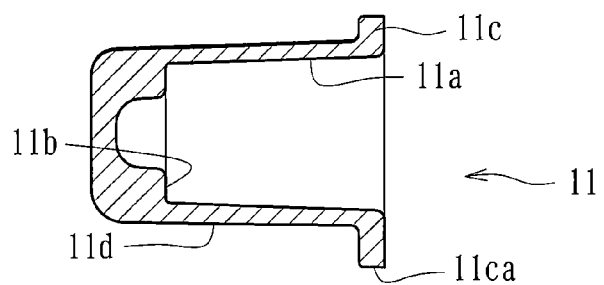

[Fig. 16]
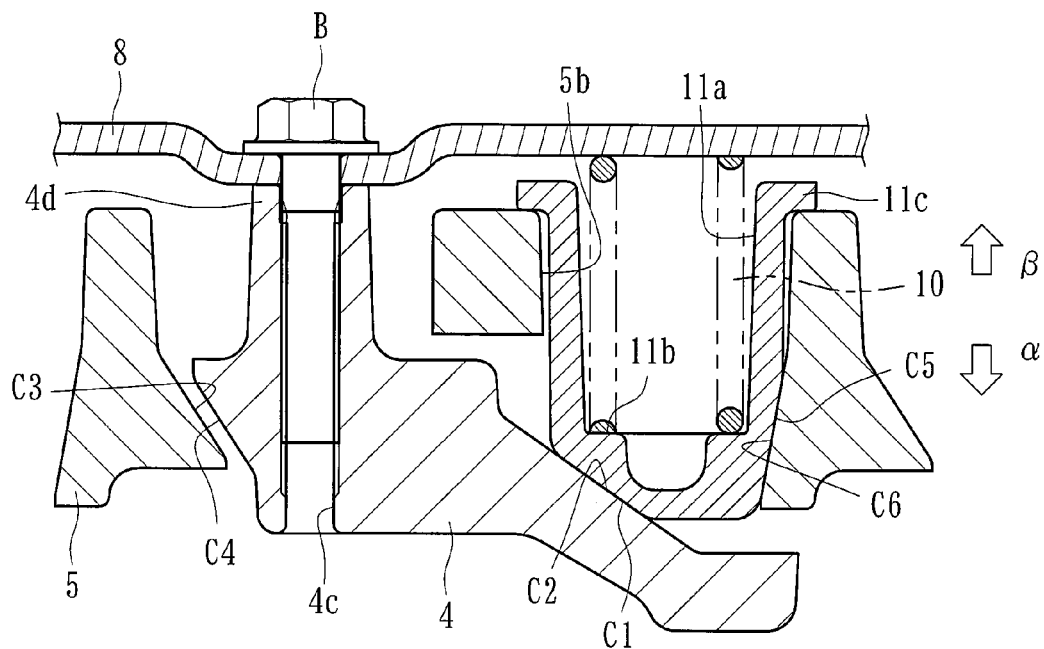
[Fig. 17]
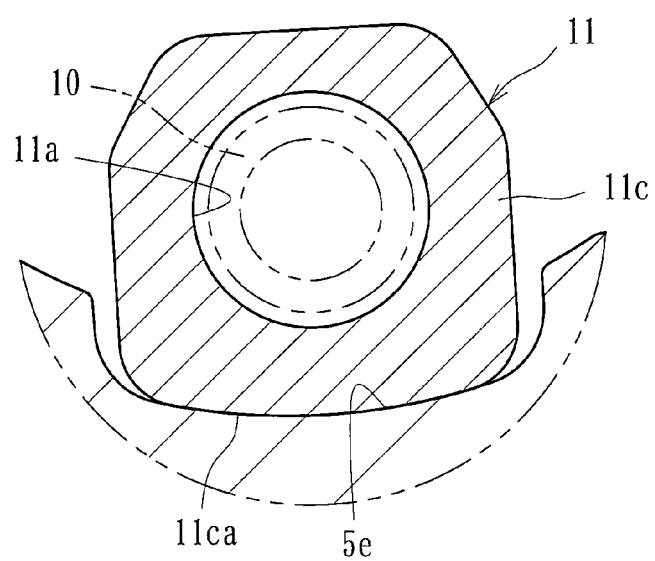

[Fig. 18]
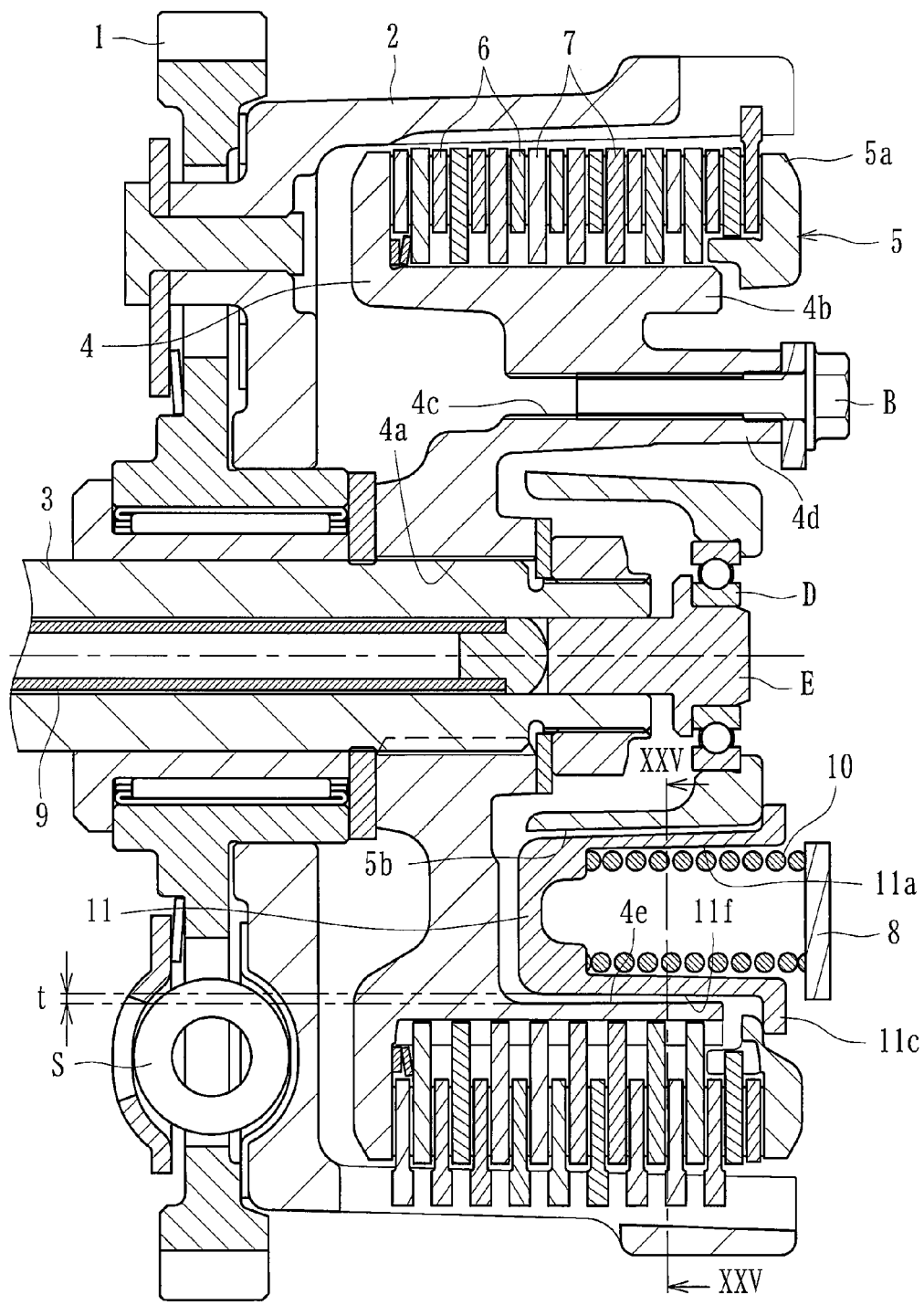

[ Fig. 19 ]
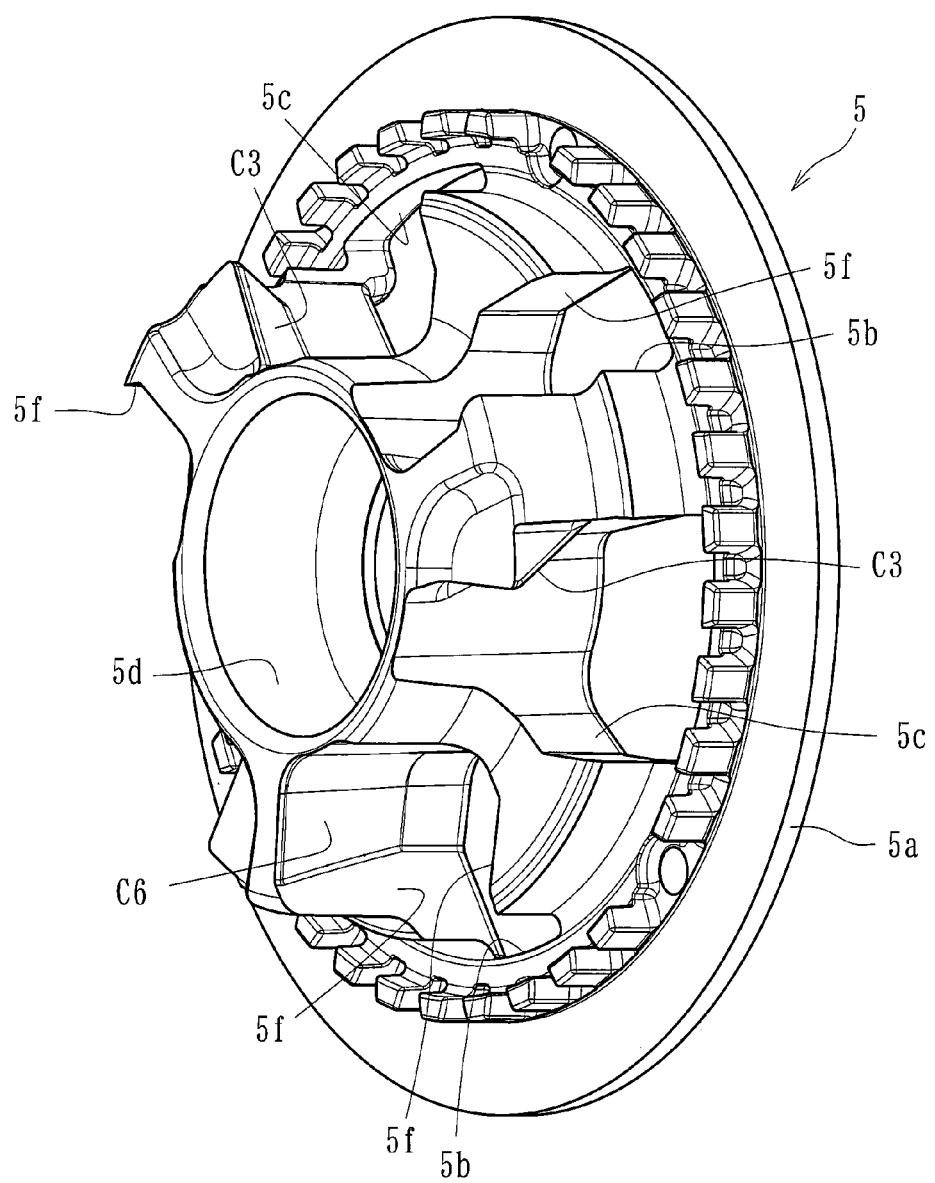

[Fig. 20]
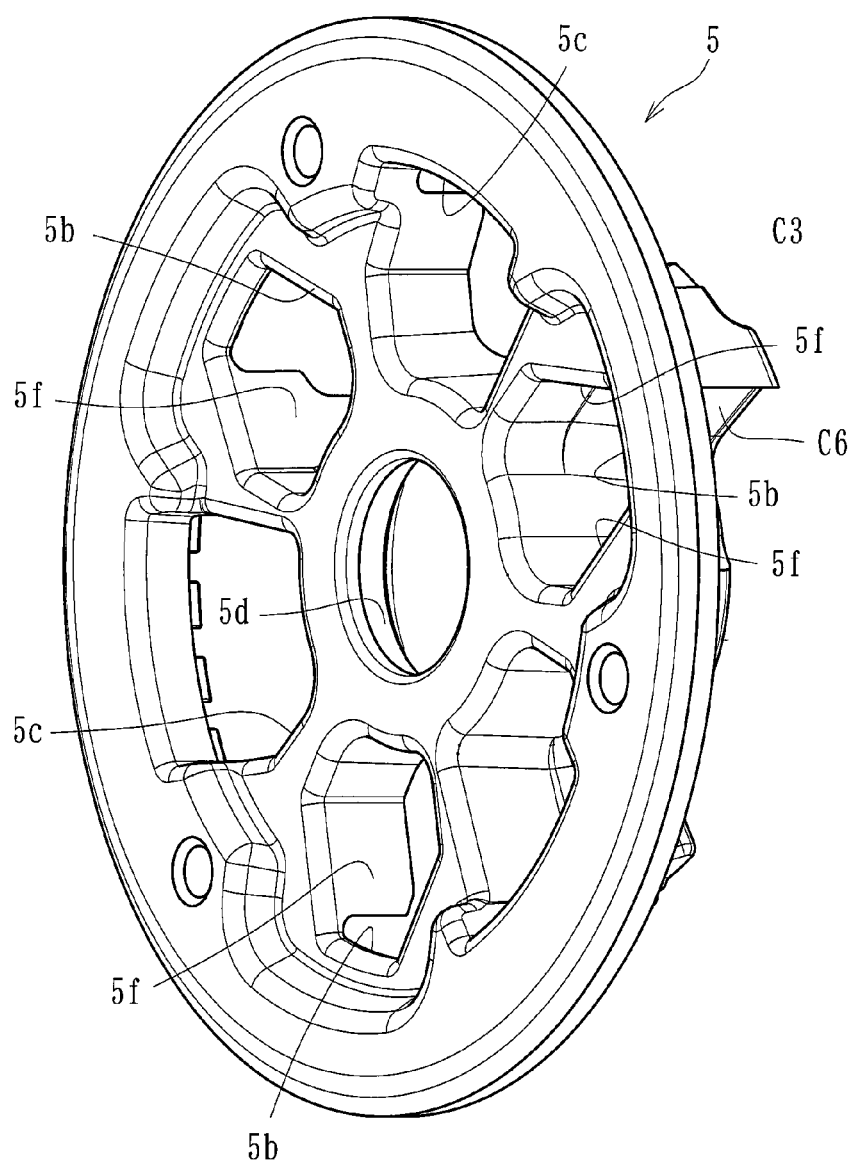

[Fig. 21]
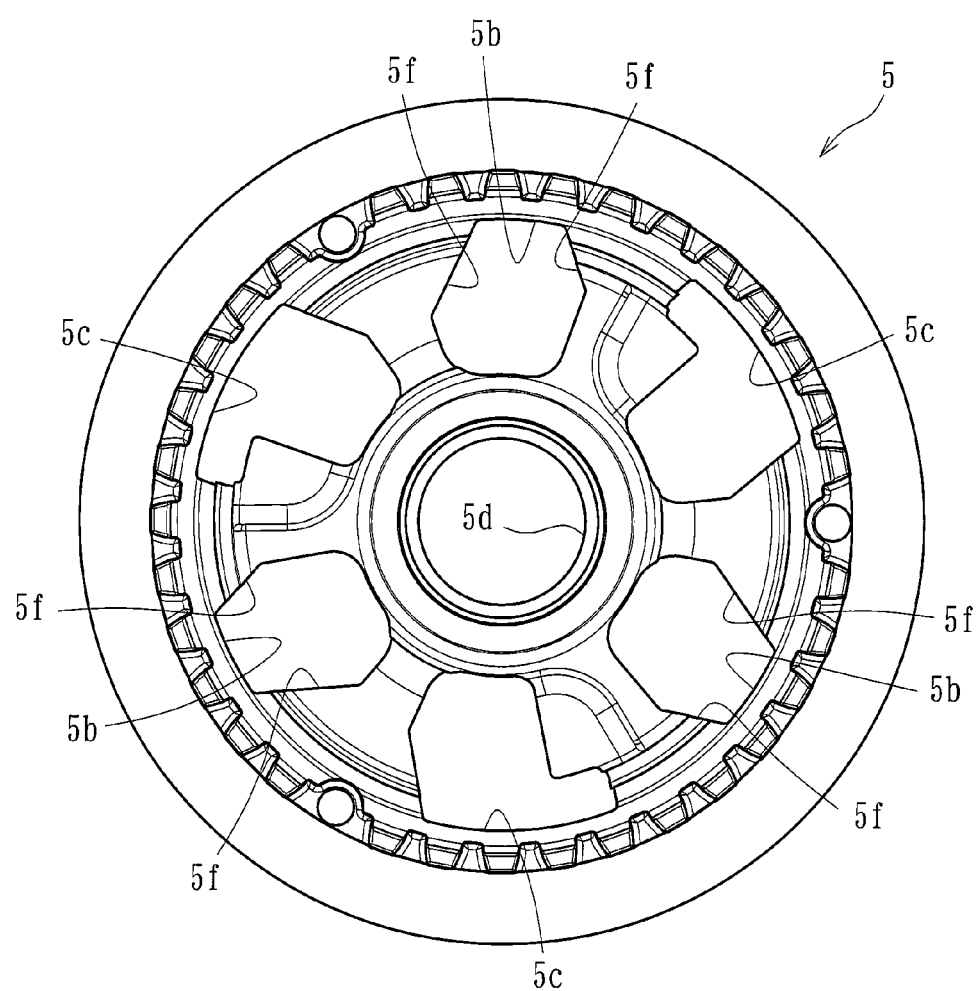

[Fig. 22]
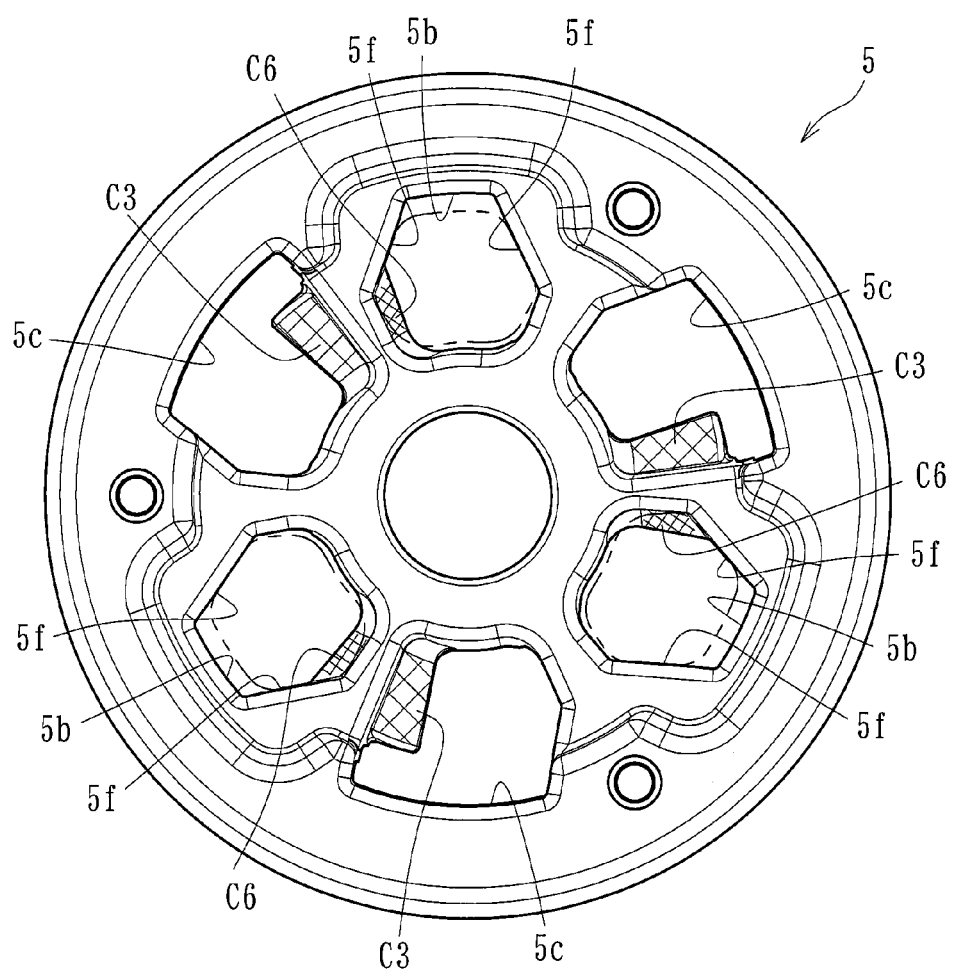

[ Fig. 23 ]
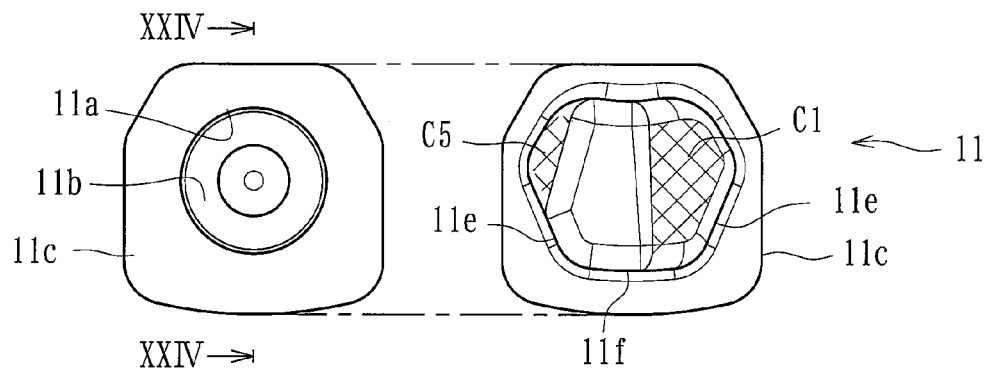
[ Fig. 24 ]
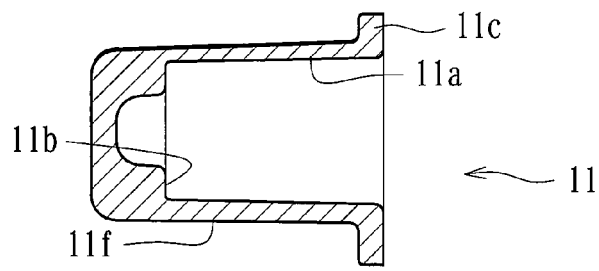
[ Fig. 25 ]
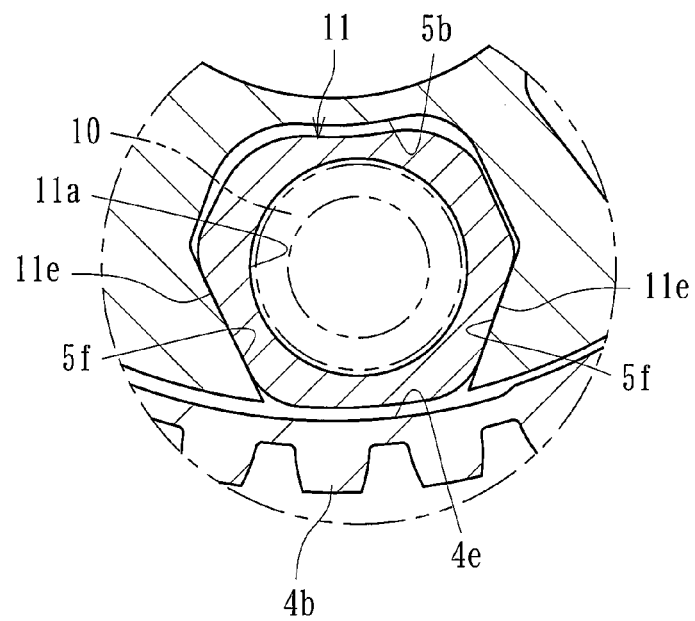

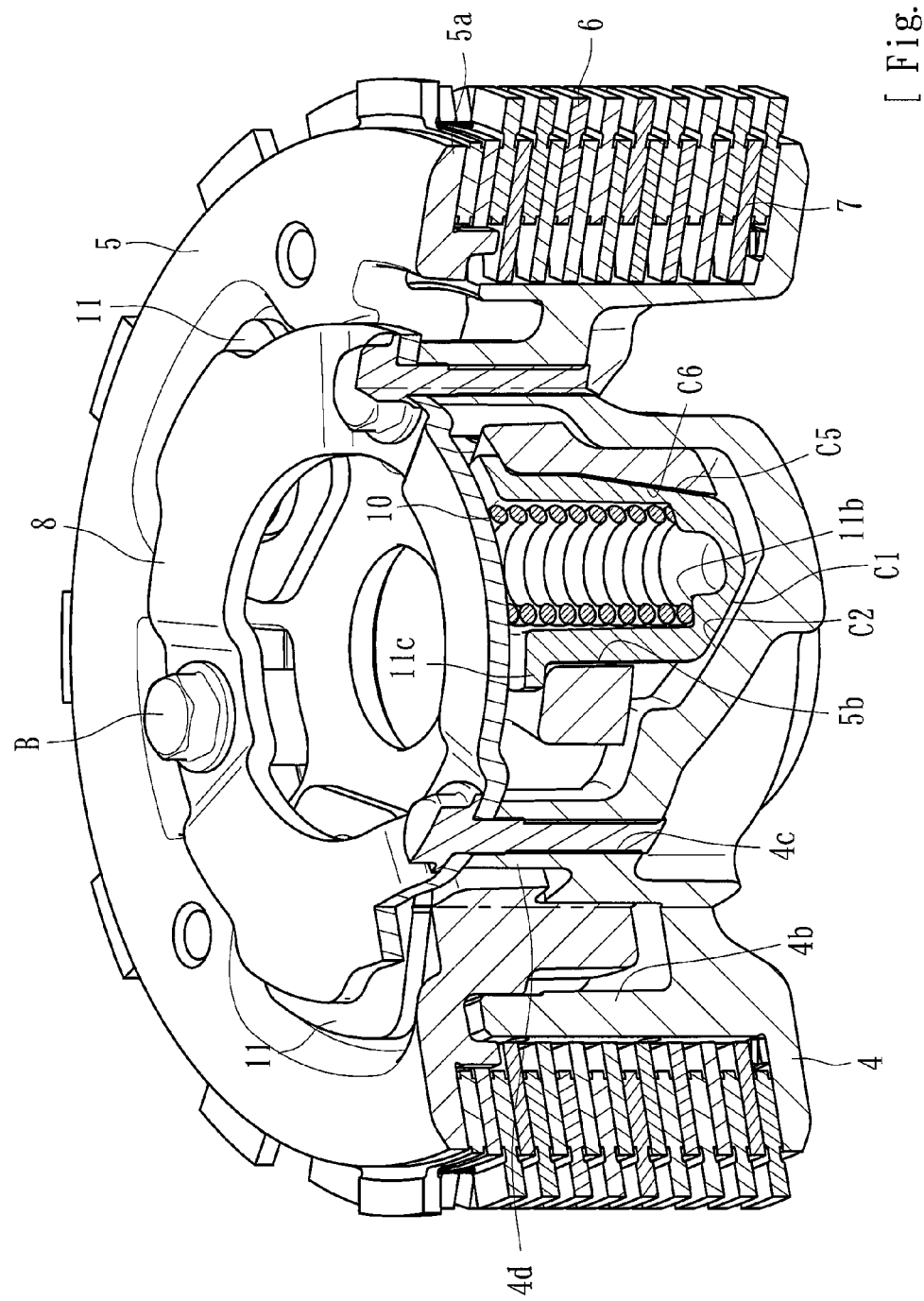
[ Fig. 26 ]

[Fig. 27]
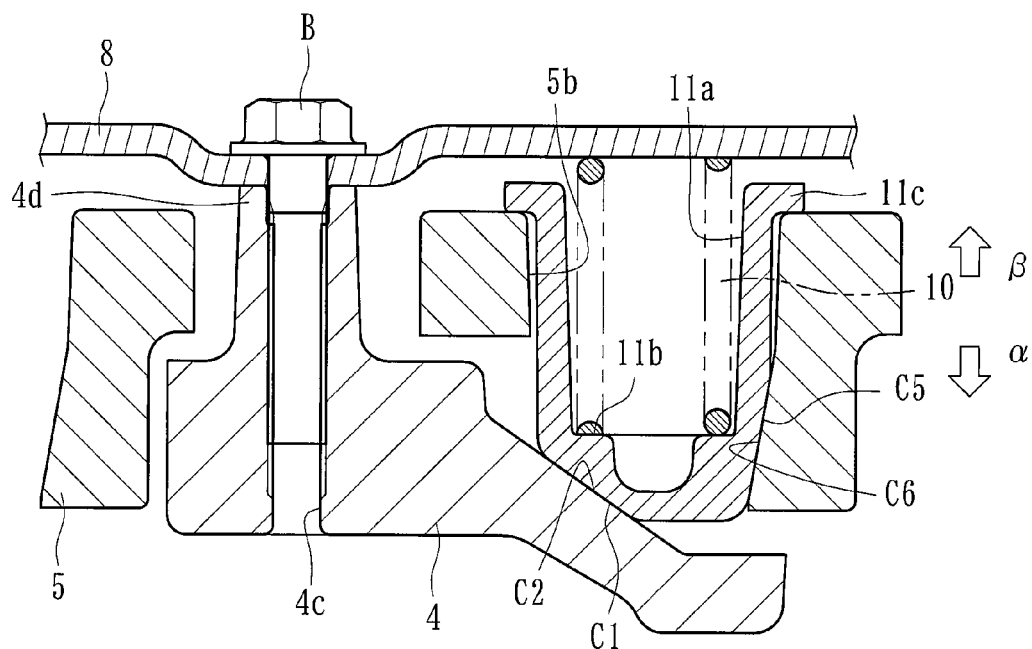

POWER TRANSMISSION DEVICE

CROSS-REFERENCE TO RELATED APPLICATIONS

This application is a continuation of International Application No. PCT/JP2019/000381, filed Jan. 9, 2019, which claims priority to Japanese Application No. 2018-002702, filed Jan. 11, 2018. The disclosures of the above applications are incorporating herein by reference.

FIELD

The present disclosure relates to a power transmission device that appropriately transmits or cuts off rotational power of an input member to an output member.

BACKGROUND

In general, a motorcycle has a power transmission device for appropriately transmitting or cutting off driving power of an engine to a transmission and a driving wheel. The power transmission device includes an input member coupled to the engine side. An output member is coupled to the transmission and driving wheel side. A clutch member is coupled to the output member. A pressure member presses clutch plates, drive-side clutch plates and driven-side clutch plates, against each other or releases a press-contact force. The power transmission device is configured to transmit power by pressing the drive-side clutch plates and the driven-side clutch plates against each other. This cuts off power by releasing the press-contact force.

For example, in a power transmission device disclosed in WO2016/024557, a receiving member is attached to the pressure member. A clutch spring, urging means, contained in the receiving member to urge the pressure member in a direction so that the drive-side clutch plates and driven-side clutch plates are pressed against each other. One cam surface is formed in the receiving member. The other cam surface, which faces the one cam surface, is formed in the clutch member. These cam surfaces constitute a back-torque limiting cam that reduces the press-contact force between the drive-side clutch plates and the driven-side clutch plates. The pressure member and the clutch member rotate relative to each other when the rotation speed of the output member exceeds the rotation speed of the input member.

That is, if the pressure member and the clutch member rotate relative to each other when the rotation speed of the output member exceeds the rotation speed of the input member, the one cam surface and the other cam surface slide over each other. The back-torque limiting cam functions to move the receiving member in the axial direction relative to the pressure member. The urging force of the clutch spring applied to the pressure member decreases. Thus, the press-contact force between the drive-side clutch plates and the driven-side clutch plates is reduced.

SUMMARY

However, in the existing power transmission device described above, when the entire device, including the pressure member and the clutch member, rotates at a high speed, the receiving member is pressed against the clutch member, which is positioned radially outside, by a generated centrifugal force. The sliding resistance of the receiving member may become larger than expected. In this case, when a driver operates a clutch lever or the like to separate the pressure member from the clutch member to disengage the clutch, release the press-contact force between the clutch plates, and subsequently reengages the clutch, to press the clutch plates against each other, movement of the receiving member is slowed due to excessive sliding resistance. Thus, a problem arises in that the response, when engaging the clutch, becomes dull and the driver experiences an unpleasant sensation in operability due to feeling of idle driving.

The present disclosure is designed to overcome the background deficiencies described above. It provides a power transmission device that can improve responsiveness when engaging a clutch. This improves operability by reducing the sliding resistance of a receiving member.

According to the disclosure, a power transmission device comprises a clutch housing that rotates together with rotation of an input member. A plurality of drive-side clutch plates are attached to the clutch housing. A clutch member has a plurality of driven-side clutch plates alternately formed with the drive-side clutch plates of the clutch housing. They are attached with an output member. A pressure member is attached to the clutch member. The pressure member presses the drive-side clutch plates and the driven-side clutch plates against each other or releases a press-contact force in accordance with relative movement to the clutch member in an axial direction. An urging member moves the pressure member in a direction such that the drive-side clutch plates and the driven-side clutch plates are pressed against each other. A receiving member, constituted by a separate member, is attached to the pressure member. The receiving member receives an urging force of the urging member on the pressure member side. It transmits the urging force to the pressure member. A back-torque limiting cam, constituted by a pair of cam surfaces, reduces a press-contact force between the drive-side clutch plates and the driven-side clutch plates. The pressure member and the clutch member rotate relative to each other when a rotation speed of the output member exceeds a rotation speed of the input member. One of the cam surfaces is formed in the receiving member. The other cam surface is formed in the clutch member. The power transmission device transmits or cuts off rotational power input to the input member to the output member by pressing the drive-side clutch plates and the driven-side clutch plates against each other or releasing the press-contact force. The power transmission device includes a radially-outside restricting portion that restricts radially-outward movement of the receiving member relative to the pressure member. Also, it maintains a clearance between a side surface of the receiving member and the clutch member.

In the power transmission device, the radially-outside restricting portion includes a flange portion formed on an opening side of the receiving member. A contact portion is formed in the pressure member. The contact portion restricts the radially-outward movement of the receiving member by making contact with the flange portion.

In the power transmission device, the contact portion is a wall surface extending in a rotation axis direction of the pressure member. It conformably makes contact with a side surface of the flange portion.

In the power transmission device, the contact portion, in plan view, has a conforming shape to an outer peripheral shape of the flange portion.

In the power transmission device, an attachment hole, for attaching the receiving member, is formed in the pressure member. The radially-outside restricting portion is a radially-outside opening of the attachment hole. It restricts the radially-outward movement by contacting the receiving member.

In the power transmission device, the receiving member has a contact surface with a shape conforming to the radially-outside opening of the attachment hole. The contact surface contacts with the radially-outside opening.

The power transmission device has the radially-outside restricting portion that restricts radially-outward movement of the receiving member relative to the pressure member. Thus, it maintains the clearance between the side surface of the receiving member and the clutch member. This makes it possible to improve responsiveness when engaging the clutch. Also, it improves operability by reducing the sliding resistance of the receiving member.

The radially-outside restricting portion includes the flange portion. The flange portion is formed on the opening side of the receiving member. The contact portion is formed in the pressure member. It restricts radially-outward movement of the receiving member by making contact with the flange portion. Thus, it is possible to restrict the radially-outward movement by using the flange portion of the receiving member. It is also possible to reliably reduce the sliding resistance of the receiving member.

The contact portion is the wall surface extending in the rotation axis direction of the pressure member. The contact portion contacts the side surface of the flange portion. Thus, it is possible to cause the flange portion to stably contact with the contact portion. It is also possible to more reliably reduce the sliding resistance of the receiving member.

The contact portion, in plan view, has a shape conforming to the outer peripheral shape of the flange portion. Thus, it is possible to cause the flange portion to contact the contact portion. It is also possible to further reliably reduce the sliding resistance of the receiving member.

The attachment hole, for attaching the receiving member, is formed in the pressure member. The radially-outside restricting portion is the radially-outside opening of the attachment hole. It restricts the radially-outward movement by contacting the receiving member. Thus, is possible to restrict radially-outward movement of the receiving member by using the radially-outside opening of the attachment hole. It is also possible to reliably reduce the sliding resistance of the receiving member.

The receiving member has the contact surface conforming to the radially-outside opening of the attachment hole. The contact surface contacts the radially-outside opening. Thus, it is possible to cause the receiving member to stably contact the radially-outside opening, It is also possible to more reliably reduce the sliding resistance of the receiving member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is longitudinal sectional view of a power transmission device according to a first embodiment.

FIG. 2 is a perspective view of the power transmission device in a state with a clutch housing and the like removed.

FIG. 3 is a top plan view of the power transmission device of FIG. 2.

FIG. 4 is a cutaway cross-section view taken along line IV-IV in FIG. 3.

FIG. 5 is a perspective view of a clutch member of the power transmission device.

FIG. 6 is a front plan view of the clutch member.

FIG. 7 is a rear view of the clutch member.

FIG. 8 is a perspective view of a pressure member of the power transmission device seen from one side.

FIG. 9 is a perspective view of the pressure member seen from the other side.

FIG. 10 is a back plan view of the pressure member.

FIG. 11 is a front plan view of the pressure member.

FIG. 12 is a perspective view of a receiving member of the power transmission device seen from one side.

FIG. 13 is a perspective view of the receiving member seen from the other side.

FIG. 14 is a front plan view and a rear view of the receiving member.

FIG. 15 is a sectional view taken along line XV-XV in FIG. 14.

FIG. 16 is a cross-section developed view illustrating cam surfaces of the power transmission device.

FIG. 17 is a sectional view, taken along line XVII-XVII in FIG. 1, illustrating a radially-outside restricting portion of the power transmission device.

FIG. 18 is a longitudinal sectional view of a power transmission device according to a second embodiment.

FIG. 19 is a perspective view of a pressure member of the power transmission device seen from one side.

FIG. 20 is a perspective view of the pressure member seen from the other side.

FIG. 21 is a back plan view of the pressure member.

FIG. 22 is a front plan view of the pressure member.

FIG. 23 is a front plan view and a rear plan view of a receiving member of the power transmission device.

FIG. 24 is a sectional view taken along line XXIV-XXIV in FIG. 23.

FIG. 25 is a sectional view, taken along line XXV-XXV in FIG. 18, illustrating a radially-outside restricting portion of the power transmission device.

FIG. 26 is a partially cutaway cross-section view of a power transmission device according to another embodiment.

FIG. 27 is a cross-section developed view illustrating cam surfaces of the power transmission device.

DETAILED DESCRIPTION

Hereafter, embodiments of the present disclosure will be described in detail with reference to the drawings.

A power transmission device according to the present embodiment is disposed in a vehicle, such as a motorcycle, and appropriately transmits or cuts off driving power of an engine to the transmission and driving wheel side. As illustrated in FIG. 1, the power transmission device includes a clutch housing 2 with a gear 1 as an input member. A clutch member 4 is coupled to a shaft 3 as an output member. A pressure member 5 is formed on the right-end side of the clutch member 4 in the figure. Drive-side clutch plates 6 are coupled to the clutch housing 2 side. Driven-side clutch plates 7 are coupled to the clutch member 4 side. A fixing member 8, a push rod 9, clutch springs 10, as urging means, and receiving members 11 fill out the device. In the figure, the symbol S represents a damper, and the symbol D represents a ball bearing.

The gear 1 can rotate around the shaft 3 when driving power (rotational power) transmitted from the engine is input. The gear 1 is coupled to the clutch housing 2 by using rivets and the like. The clutch housing 2 includes a cylindrical case member whose right end side in the figure is open. A plurality of drive-side clutch plates 6 are attached to the inner peripheral wall of the clutch housing 2. Each of the drive-side clutch plates 6 is a substantially annular plate. The plates are fit into a spline formed in the inner peripheral surface of the clutch housing 2. The plates 6 are rotatable together with rotation of the clutch housing 2 and slidable in the axial direction (left-right directions in FIG. 1).

The clutch member 4 is constituted by members disposed in the clutch housing 2. As illustrated in FIGS. 5 to 7, the clutch member 4 includes a central hole 4$a$ through which the shaft 3 can be inserted. An outer peripheral wall 4$b$ includes splines. Bolt holes 4$c$ receive bolts B. Boss portions 4$d$ include the bolt holes 4$c$. An inner peripheral surface 4$e$ is formed of the outer peripheral wall 4$b$. Splines are formed in each of the inner peripheral surface of the central hole 4$a$ and the outer peripheral surface of the shaft 3. The shaft 3 is spline-fit and coupled to the central hole 4$a$. Thus, so that the shaft 3 also rotates when the clutch member 4 rotates. The driven-side clutch plates 7 are fit and attached to the splines formed in the outer peripheral wall 4$b$.

To be more specific, the splines, that are formed in the outer peripheral wall 4$b$ of the clutch member 4, include protrusions and recesses that are integrally formed around substantially the entire periphery of the outer peripheral wall 4$b$. The driven-side clutch plates 7 engage with recessed grooves of the splines. Movement of the driven-side clutch plates 7 in the rotational direction is restricted. Movement of the driven-side clutch plates 7 relative to the clutch member 4 in the axial direction is allowed. The driven-side clutch plates 7 rotate together with the clutch member 4.

The driven-side clutch plates 7 are stacked alternately with the drive-side clutch plates 6. The drive-side clutch plates 6 and the driven-side clutch plates 7, that are adjacent to each other, can be pressed against each other or the press-contact force can be released. That is, the drive-side clutch plates 6 and the driven-side clutch plates 7 are allowed to slide in the axial direction of the clutch member 4. When pressed by the pressure member 5 in the leftward direction in FIG. 1, the drive-side clutch plates 6 and the driven-side clutch plates 7 are pressed against each other. Thus, the rotational power of the clutch housing 2 can be transmitted to the shaft 3 via the clutch member 4. When pressing by the pressure member 5 is relieved, the press-contact force is released, the clutch member 4 stops following the rotation of the clutch housing 2 and stops. Thus, rotational power is not transmitted to the shaft 3.

Moreover, as illustrated in FIGS. 2 to 4, the fixing member 8 is fixed to the tip-end side of the boss portions 4$d$ by the bolts B, that are inserted through the bolt holes 4$c$. The clutch springs 10, as an urging means, are attached to the fixing member 8. To be specific, the fixing member 8 is an annular metal member. It is fixed to the tip ends of the boss portions 4$d$ by using the bolts B. It is mounted in such a way that the receiving members 11 are positioned between the bolts B. Also, the other end portions of the clutch springs 10 are in contact with the fixing member 8.

Each of the clutch spring 10 is a coil spring. The spring 10 is mounted in such a way that, in a state of being contained in the receiving member 11, one end is in contact with the bottom surface side of the receiving member 11, a receiving portion 11$b$. The other end is in contact with the fixing member 8. The clutch spring 10 can constantly urge the pressure member 5 in a direction such that the drive-side clutch plates 6 and the driven-side clutch plates 7 are pressed against each other in a direction such that the pressure member 5 becomes closer to the clutch member 4. Another urging means may be used as the clutch spring 10.

The pressure member 5 is attached to the clutch member 4 at a position on the right end side in FIG. 1. Thus, the pressure member 5 is movable in the axial direction of the clutch member 4 (left-right directions in FIG. 1). The pressure member 5 can press the drive-side clutch plates 6 and the driven-side clutch plates 7 against each other or release the press-contact force in accordance with movement thereof relative to the clutch member 4 in the axial direction. To be more specific, as illustrated in FIGS. 8 to 11, the pressure member 5 includes a flange portion 5$a$ that can press the drive-side clutch plates 6 and the driven-side clutch plates 7 against each other. Attachment holes 5$b$, for attaching the receiving members 11, through-holes 5$c$, a central hole 5$d$, and contact portions 5$e$, are included in the pressure member 5.

A pressed member E is attached, via the ball bearing D as illustrated in FIG. 1, to the central hole 5$d$ of the pressure member 5. The pressed member E is attached to the tip end side of the shaft 3 and is movable so as to follow the push rod 9. When a driver operates an operation means, such as a clutch lever or the like (not shown), this causes the push rod 9 to protrude in the rightward direction in the figure. The pressed member E moves in the same direction. Thus, the pressure member 5 can be moved in the rightward direction in FIG. 1, direction away from the clutch member 4, against the urging forces of the clutch springs 10.

When the pressure member 5 moves in the rightward direction, the press-contact force between the drive-side clutch plates 6 and the driven-side clutch plates 7 is released. The rotational power input to the gear 1 and the clutch housing 2 is cut off and not transmitted to the clutch member 4 and the shaft 3. The clutch is disengaged. When the driver stops operating the operation means, the pressure member 5 moves in the leftward direction in FIG. 1 due to the urging forces of the clutch springs 10. The drive-side clutch plates 6 and the driven-side clutch plates 7 are pressed against each other. Thus, rotational power input to the gear 1 and the clutch housing 2 is transmitted to the clutch member 4 and the shaft 3. The clutch is engaged. That is, the pressure member 5 is pressing the drive-side clutch plates 6 and the driven-side clutch plates 7 against each other or releasing the press-contact force in accordance with movement relative to the clutch member 4 in the axial direction.

Moreover, the attachment holes 5$b$ are formed in the pressure member 5 at a plurality of (three) positions on the same circle at regular intervals. A receiving member 11 is attached to each of the attachment holes 5$b$. The receiving members 11, attached to the attachment holes 5$b$ of the pressure member 5, contact with one end of the clutch spring 10 and receive the urging force. It is separate from the pressure member 5. To be specific, as illustrated in FIGS. 12 to 15, the receiving member 11, according to the present embodiment, has a cup-shaped member. The cup-shaped member includes a recessed portion 11$a$ that contains the clutch spring 10. A receiving portion 11$b$ is formed in the recessed portion 11$a$. The receiving portion 11$b$ contacts with one end portion of the clutch spring 10 and receives the urging force. A flange portion 11$c$ contacts the pressure member 5. It transmits the urging force of the clutch spring 10 to the pressure member 5. A side surface 11$d$ is on the cup-shaped member.

Among these, the flange portion 11$c$ is formed on the opening side of the receiving member 11. When the receiving member 11 is attached to the attachment hole 5$b$, the flange portion 11c makes contact with the opening edge of the attachment hole 5b. After attaching the receiving member 11 to the attachment hole 5b, the clutch spring 10 is mounted into the recessed portion 11a. One end portion of the spring is in contact with the receiving portion 11b. The urging force of the clutch spring 10 is transmitted to the pressure member 5 side via the flange portion 11c of the receiving members 11. The drive-side clutch plates 6 and the driven-side clutch plates 7 can be pressed against each other by using the transmitted urging force.

Moreover, the power transmission device according to the present embodiment includes a press-contact assisting cam. The cam increases the press-contact force between the drive-side clutch plates 6 and the driven-side clutch plates 7. The pressure member 5 and the clutch member 4 rotate relative to each other when rotational power input to the gear 1, as an input member, is transmitted to the shaft 3 as an output member. A back-torque limiting cam reduces the press-contact force between the drive-side clutch plates 6 and the driven-side clutch plates 7. The pressure member 5 and the clutch member 4 rotate relative to each other when the rotation speed of the shaft 3, as an output member, exceeds the rotation speed of the gear 1, as an input member. Cam surfaces, first to sixth cam surfaces C1 to C6, that constitute the press-contact assisting cam and the back-torque limiting cam are shown by shading (cross-hatching) in the figures.

As illustrated in FIGS. 4 and 16, the press-contact assisting cam according to the present embodiment is configured by the third cam surfaces C3 and the fourth cam surfaces C4. They are respectively formed in the pressure member 5 and the clutch member 4. Also, they face each other. That is, when assembling the clutch member 4 and the pressure member 5 together, the third cam surfaces C3, see FIG. 11, formed in the pressure member 5, and the fourth cam surfaces C4, see FIG. 7, formed in the clutch member 4, are disposed so as to face each other. Thus, if the pressure member 5 and the clutch member 4 rotate relative to each other, when rotational power input to the gear 1 becomes capable of being transmitted to the shaft 3, the pressure member 5 is moved in the direction α in FIG. 16 by the cam function of the third cam surfaces C3 and the fourth cam surfaces C4. Thus, the pressure member 5 moves closer to the clutch member 4. The press-contact force between the drive-side clutch plates 6 and the driven-side clutch plates 7 is increased.

As illustrated in FIGS. 4 and 16, the back-torque limiting cam according to the present embodiment is configured by the first cam surfaces C1 and the second cam surfaces C2. They are respectively formed in the receiving members 11 and the clutch member 4. Also, they face each other. That is, when assembling the clutch member 4, the pressure member 5, and the receiving members 11 together, the first cam surfaces C1, see FIGS. 13 and 14, formed in the bottom side surfaces of the receiving members 11, and the second cam surfaces C2, see FIG. 6, formed in the clutch member 4, are disposed to face each other. Thus, if the pressure member 5 and the clutch member 4 rotate relative to each other when the rotation speed of the shaft 3 exceeds the rotation speed of the gear 1, the receiving members 11 are moved in the direction β in FIG. 16 by the cam function of the first cam surfaces C1 and the second cam surfaces C2. This reduces the urging force of the clutch springs 10 transmitted to the pressure member 5. The press-contact force between the drive-side clutch plates 6 and the driven-side clutch plates 7 is reduced. Reduction of the press-contact force refers to a state where rotational-power transmitting capacity is reduced due to sliding of the drive-side clutch plates 6 and the driven-side clutch plates 7 over each other.

Moreover, as illustrated in FIG. 14, in each of the receiving members 11 according to the present embodiment, the fifth cam surface C5 is formed on a side opposite from the first cam surface C1. The sixth cam surfaces C6, see FIG. 11, each facing the fifth cam surface C5, are formed in the pressure member 5. That is, in both side surfaces of the bottom portion of each of the receiving members 11, the first cam surface C1 and the fifth cam surface C5 are respectively formed. The back-torque limiting cam includes the first cam surfaces C1, the second cam surfaces C2, the fifth cam surfaces C5, and the sixth cam surfaces C6.

When assembling the clutch member 4, the pressure member 5, and the receiving members 11 together, the first cam surfaces C1, formed in the receiving members 11, and the second cam surfaces C2, formed in the clutch member 4, are disposed to face each other. The fifth cam surfaces C5, formed in the receiving members 11, and the sixth cam surfaces C6, formed in the pressure member 5, are disposed to face each other. Thus, if the pressure member 5 and the clutch member 4 rotate relative to each other when the rotation speed of the shaft 3 exceeds the rotation speed of the gear 1, the receiving members 11 are moved in the direction β in FIG. 16 by the cam function of the first cam surfaces C1 and the second cam surfaces C2 and the cam function of the fifth cam surfaces C5 and the sixth cam surfaces C6. Thus, the press-contact force between the drive-side clutch plates 6 and the driven-side clutch plates 7 is reduced.

Thus, when the back-torque limiting cam functions, the receiving members 11 receive both of the cam function of the first cam surfaces C1 and the second cam surfaces C2 and the cam function of the fifth cam surfaces C5 and the sixth cam surfaces C6. Although the back-torque limiting cam according to the present embodiment includes the fifth cam surfaces C5 and the sixth cam surfaces C6, in addition to the first cam surfaces C1 and the second cam surfaces C2, the back-torque limiting cam may have only the first cam surfaces C1 and the second cam surfaces C2.

Here, the power transmission device, according to the present embodiment, includes a radially-outside restricting portion. It restricts radially-outward movement of the receiving member 11 relative to the pressure member 5, in a direction outward from the rotational center of the pressure member 5. Also, it maintains the clearance t (see FIG. 1) between the side surface 11d of the receiving members 11 and the inner peripheral surface 4e of the clutch member 4. To be specific, as illustrated in FIGS. 1 and 17, the radially-outside restricting portion according to the present embodiment includes the flange portion 11c, formed on the opening side of each of the receiving members 11, and the contact portion 5e, formed in the pressure member 5. The contact portion 5e restricts radially-outward movement of the receiving member 11 by making contact with the flange portion 11c.

That is, in a state where the receiving member 11 is attached to the attachment hole 5b, the contact portion 5e is formed at a position radially outside of the flange portion 11c of the receiving member 11. When the pressure member 5 and the like rotate at a high speed and the receiving member 11 receives a radially-outward centrifugal force, the flange portion 11c contacts the contact portion 5e and resists the centrifugal force. Therefore, it is possible to avoid radially-outward movement of the receiving member 11. This maintains the clearance t (gap) between the side surface 11d of the receiving member 11 and the inner peripheral surface 4e of the clutch member 4.

The contact portion 5e according to the present embodiment is integrally formed on the radially outer side of the attachment hole 5b of the pressure member 5. It includes a wall surface extending in the rotation axis direction of the pressure member 5, left-right directions in FIG. 1. The wall contacts a radially-outer side surface 11ca, outer peripheral end surface, of the flange portion 11c of the receiving member 11. Moreover, as illustrated in FIG. 17, the contact portion 5e, according to the present embodiment, has a shape conforming to the outer shape of the flange portion 11c in plan view. The radially-outer side surface 11ca of the flange portion 11c contacts substantially the entire area of the contact portion 5e.

The present embodiment includes the radially-outside restricting portion that can restrict radially-outward movement of the receiving member 11 relative to the pressure member 5. It maintains the clearance t between the side surface 11d of the receiving member 11 and the clutch member 4. Therefore, with the present embodiment, it is possible to prevent the receiving member 11 from sliding over the inner peripheral surface 4e of the clutch member 4. Also, it is possible to improve responsiveness when engaging the clutch. Further, it improves operability by reducing the sliding resistance of the receiving member 11.

Moreover, the radially-outside restricting portion according to the present embodiment includes the flange portion 11c formed on the opening side of the receiving member 11. The contact portion 5e, formed in the pressure member 5, restricts radially-outward movement of the receiving member 11 by contacting the flange portion 11c. Thus, it is possible to restrict the radially-outward movement by using the flange portion 11c of the receiving member 11. Thus, it is possible to reliably reduce the sliding resistance of the receiving member 11.

Moreover, the contact portion 5e, according to the present embodiment, includes the wall surface extending in the rotation axis direction of the pressure member 5. The wall contacts the side surface 11ca of the flange portion 11c. Thus, it is possible to cause the flange portion 11c to stably contact the contact portion 5e. Thus, and it is possible to more reliably reduce the sliding resistance of the receiving member 11. Furthermore, the contact portion 5e, according to the present embodiment, has a shape conforming to the outer shape of the flange portion 11c, in plan view. Thus, it is possible to cause the flange portion 11c to stably contact with the contact portion 5e. Accordingly, it is possible to further reliably reduce the sliding resistance of the receiving member 11.

Next, a power transmission device according to a second embodiment will be described.

As with the first embodiment, a power transmission device according to the present embodiment is disposed in a vehicle, such as a motorcycle. It appropriately transmits or cuts off driving power of an engine to the transmission and driving wheel side. As illustrated in FIG. 18, the power transmission device includes a clutch housing 2 with a gear 1 as an input member. A clutch member 4 coupled to a shaft 3 is an output member. A pressure member 5 is formed on the right-end side of the clutch member 4 in the figure. Drive-side clutch plates 6 are coupled to the clutch housing 2. Driven-side clutch plates 7 are coupled to the clutch member 4 side. A fixing member 8, a push rod 9, clutch springs 10, as an urging means, and receiving members 11 are illustrated. Elements that are the same as those of the first embodiment will be denoted by the same numerals, and detailed descriptions of such elements will be omitted.

The pressure member 5 is attached to the clutch member 4 at a position on the right end side in FIG. 18. The pressure member 5 is movable in the axial direction of the clutch member 4, left-right directions in FIG. 18. The pressure member 5 can press the drive-side clutch plates 6 and the driven-side clutch plates 7 against each other or release the press-contact force in accordance with movement relative to the clutch member 4 in the axial direction. To be more specific, as illustrated in FIGS. 19 to 22, the pressure member 5, according to the present embodiment, includes a flange portion 5a that can press the drive-side clutch plates 6 and the driven-side clutch plates 7 against each other. Attachment holes 5b attach the receiving members 11. Through-holes 5c, and a central hole 5d are present.

The receiving member 11 is attached to the attachment hole 5b of the pressure member 5. It contacts with one end of the clutch spring 10 and receive the urging force. It is separate from the pressure member 5. To be specific, as illustrated in FIGS. 23 and 24, the receiving member 11, according to the present embodiment, is a cup-shaped member. It includes a recessed portion 11a that contains the clutch spring 10. The receiving portion 11b is formed in the recessed portion 11a. The receiving portion 11b contacts one end portion of the clutch spring 10 and receives an urging force. A flange portion 11c contacts the pressure member 5. The flange portion 11c transmits the urging force of the clutch spring 10 to the pressure member 5. A contact surface 11e and a radially-outer side surface 11f constitute the outer peripheral surface of the receiving member 11.

Here, the power transmission device, according to the present embodiment, includes a radially-outside restricting portion that restrict radially-outward movement of the receiving member 11 relative to the pressure member 5, in a direction outward from the rotational center of the pressure member 5, It maintains the clearance t (see FIG. 18) between the side surface 11d of the receiving members 11 and the inner peripheral surface 4e of the clutch member 4. To be specific, as illustrated in FIGS. 22 and 25, the radially-outside restricting portion according to the present embodiment is a radially-outside opening 5f of the attachment hole 5b of the pressure member 5. It is configured to restrict radially-outward movement by contact with the receiving member 11.

The radially-outside opening 5f is a part whose opening dimension is smaller than the width of the receiving member 11. It conforms to the contact surface 11e of the receiving member 11. That is, in a state where the receiving member 11 is attached to the attachment hole 5b, the contact surface 11e of the receiving member 11 contacts the radially-outside opening 5f of the attachment hole 5b. When the pressure member 5 and the like rotate at a high speed and the receiving member 11 receives a radially-outward centrifugal force, the contact surface 11e contacts the radially-outside opening 5f and resists the centrifugal force. Therefore, it is possible to avoid radially-outward movement of the receiving member 11. This maintains the clearance t (gap) between the radially-outer side surface 11f of the receiving member 11 and the inner peripheral surface 4e of the clutch member 4.

The contact surface 11e of the receiving member 11, according to the present embodiment, has a shape conforming to the radially-outside opening 5f of the attachment hole 5b. The contact surface 11e is configured to contact the radially-outside opening 5f. To be specific, the contact surface 11e includes two surfaces in two directions, between which the radially-outer side surface 11f is interposed. The contact surface 11e is configured to contact the opening 5f.

Thus, it is possible to maintain the clearance t between the radially-outer side surface 11f of the receiving member 11 and the inner peripheral surface 4e of the clutch member 4 in a state where the contact surface lie and the opening 5f are in contact with each other.

The present embodiment includes the radially-outside restricting portion that restricts radially-outward movement of the receiving member 11 relative to the pressure member 5. This maintains the clearance t between the radially-outer side surface 11f of the receiving member 11 and the clutch member 4. Therefore, with the present embodiment, it is possible to prevent the receiving member 11 from sliding over the inner peripheral surface 4e of the clutch member 4. This improves responsiveness when engaging the clutch and improves operability by reducing the sliding resistance of the receiving member 11.

Moreover, the radially-outside restricting portion, according to the present embodiment, includes radially-outside opening 5f of the attachment hole 5b. It restricts radially-outward movement by contact with the receiving member 11. Thus, it is possible to restrict the radially-outward movement of the receiving member 11 by using the radially-outside opening 5f of the attachment hole 5b. This reliably reduces the sliding resistance of the receiving member 11. Furthermore, the receiving member 11, according to the present embodiment, has the contact surface lie conforming to the radially-outside opening 5f of the attachment holes 5b. The contact surface lie contacts the radially-outside opening 5f. Thus, it is possible to cause the receiving member 11 to stably make contact with the radially-outside opening 5f. This reliably reduces the sliding resistance of the receiving member 11.

The present disclosure is not limited to the embodiments described above. For example, as illustrated in FIGS. 26 and 27, the present disclosure may be applied to a power transmission device that does not have the press-contact assisting cam (the third cam surfaces C3 and the fourth cam surfaces C4 in the first and second embodiments). Even in this case, the power transmission device includes the radially-outside restricting portion that can restrict radially-outward movement of the receiving member 11 relative to the pressure member 5. This maintains the clearance t between the side surface (11d, 11f) of the receiving member 11 and the inner peripheral surface 4e of the clutch member 4. Thus, it is possible to prevent the receiving member 11 from sliding over the inner peripheral surface 4e of the clutch member 4. It is also possible to improve responsiveness when engaging the clutch and improve operability by reducing the sliding resistance of the receiving member 11.

Moreover, in the present embodiment, a plurality of (three) receiving members 11 are attached to the pressure member 5. The radially-outside restricting portion restricts radially-outward movement of each of the receiving members 11. However, only one or some selected receiving members 11 may be configured to be restricted by the radially-outside restricting portion. The number of receiving members 11 attached and the shape of each of the receiving members 11 are not limited. The power transmission device according to the present disclosure can be used as a multiple disc clutch for a motorcycle, an automobile, a three-wheeled or four-wheeled ATV, a general-purpose machine, or the like.

The present disclosure is applicable to any power transmission device that has a different outer shape or that has additional functions, as long as the power transmission device has a radially-outside restricting portion that can restrict radially-outward movement of a receiving member relative to a pressure member and can maintain a clearance between a side surface of the receiving member and a clutch member.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A power transmission device comprising:
a clutch housing that rotates together with rotation of an input member and includes a plurality of drive-side clutch plates;
a clutch member with a plurality of driven-side clutch plates that are alternately formed with the drive-side clutch plates of the clutch housing and the clutch member coupled with an output member;
a pressure member attached to the clutch member, the pressure member pressing the drive-side clutch plates and the driven-side clutch plates against each other or releasing a press-contact force in accordance with movement relative to the clutch member in an axial direction;
urging member urges the pressure member in a direction so that the drive-side clutch plates and the driven side clutch plates are pressed against each other;
a separate receiving member is attached to the pressure member, the receiving member receives an urging force of the urging member on the pressure member side, and the receiving member transmits the urging force to the pressure member; and
a back-torque limiting cam including a pair of cam surfaces that reduce a press-contact force between the drive-side clutch plates and the driven-side clutch plates if the pressure member and the clutch member rotate relative to each other when a rotation speed of the output member exceeds a rotation speed of the input member, one of the cam surfaces formed in the receiving member, the other cam surface formed in the clutch member;
the power transmission device transmits or cuts off rotational power input to the input member to the output member by pressing the drive-side clutch plates and the driven-side clutch plates against each other or releasing the press-contact force; and
the power transmission device includes a radially-outside restricting portion restricting radially-outward movement of the receiving member relative to the pressure member, the radially-outside restricting portion maintaining a clearance between a side surface of the receiving member and an inner peripheral surface of an outer peripheral wall of the clutch member to which the driven-side clutch plates are attached, and prohibiting contact between the receiving member side surface and the inner peripheral surface of the clutch member.

2. The power transmission device according to claim 1, wherein the radially-outside restricting portion includes
a flange portion formed on an opening side of the receiving member, and
a contact portion formed in the pressure member, the contact portion restricting the radially-outward movement of the receiving member by contact with the flange portion.

3. The power transmission device according to claim 2, wherein the contact portion is a wall surface extending in a rotation axis direction of the pressure member, the wall contacts a side surface of the flange portion.

4. The power transmission device according to claim 3, wherein the contact portion, in plan view, has a shape conforming to an outer peripheral shape of the flange portion.

5. The power transmission device according to claim 1, further comprising an attachment hole for attaching the receiving member is formed in the pressure member, and the radially-outside restricting portion includes a radially-outside opening of the attachment hole, the radially-outward restriction portion restricts the radially-outward movement by contact with the receiving member.

6. The power transmission device according to claim 5, wherein the receiving member has a contact surface with a shape conforming to the radially-outward opening of the attachment hole, and the contact surface contacts the radially-outside opening.

7. A power transmission device comprising:
a clutch housing that rotates together with rotation of an input member and includes a plurality of drive-side clutch plates;
a clutch member with a plurality of driven-side clutch plates that are alternately formed with the drive-side clutch plates of the clutch housing and the clutch member coupled with an output member;
a pressure member attached to the clutch member, the pressure member pressing the drive-side clutch plates and the driven-side clutch plates against each other or releasing a press-contact force in accordance with movement relative to the clutch member in an axial direction;
urging member urges the pressure member in a direction so that the drive-side clutch plates and the driven side clutch plates are pressed against each other;
a separate receiving member is attached to the pressure member, the receiving member receives an urging force of the urging member on the pressure member side, and the receiving member transmits the urging force to the pressure member; and
a back-torque limiting cam including a pair of cam surfaces that reduce a press-contact force between the drive-side clutch plates and the driven-side clutch plates if the pressure member and the clutch member rotate relative to each other when a rotation speed of the output member exceeds a rotation speed of the input member, one of the cam surfaces formed in the receiving member, the other cam surface formed in the clutch member;
the power transmission device transmits or cuts off rotational power input to the input member to the output member by pressing the drive-side clutch plates and the driven-side clutch plates against each other or releasing the press-contact force; and
the power transmission device includes a radially-outside restricting portion restricting radially-outward movement of the receiving member relative to the pressure member, the radially-outside restricting portion maintaining a clearance between a side surface of the receiving member and an inner peripheral surface of an outer peripheral wall of the clutch member and a flange portion of the receiving member contacts the restricting portion.

8. A power transmission device comprising:
a clutch housing that rotates together with rotation of an input member and includes a plurality of drive-side clutch plates;
a clutch member with a plurality of driven-side clutch plates that are alternately formed with the drive-side clutch plates of the clutch housing and the clutch member coupled with an output member;
a pressure member attached to the clutch member, the pressure member pressing the drive-side clutch plates and the driven-side clutch plates against each other or releasing a press-contact force in accordance with movement relative to the clutch member in an axial direction;
urging member urges the pressure member in a direction so that the drive-side clutch plates and the driven side clutch plates are pressed against each other;
a separate receiving member is attached to the pressure member, the receiving member receives an urging force of the urging member on the pressure member side, and the receiving member transmits the urging force to the pressure member; and
a back-torque limiting cam including a pair of cam surfaces that reduce a press-contact force between the drive-side clutch plates and the driven-side clutch plates if the pressure member and the clutch member rotate relative to each other when a rotation speed of the output member exceeds a rotation speed of the input member, one of the cam surfaces formed in the receiving member, the other cam surface formed in the clutch member;
the power transmission device transmits or cuts off rotational power input to the input member to the output member by pressing the drive-side clutch plates and the driven-side clutch plates against each other or releasing the press-contact force; and
the power transmission device includes a radially-outside restricting portion restricting radially-outward movement of the receiving member relative to the pressure member, the radially-outside restricting portion maintaining a clearance between a side surface of the receiving member and an inner peripheral surface of an outer peripheral wall of the clutch member and the radially outside restriction portion is a radially outside opening configured to restrict radially outward movement by contact with the receiving member.

* * * * *

UNITED STATES PATENT AND TRADEMARK OFFICE
CERTIFICATE OF CORRECTION

PATENT NO. : 11,359,678 B2
APPLICATION NO. : 16/925724
DATED : June 14, 2022
INVENTOR(S) : Junichi Nishikawa et al.

It is certified that error appears in the above-identified patent and that said Letters Patent is hereby corrected as shown below:

In the Specification

Column 3
Line 17          delete "opening," and insert --opening.--

Column 11
Line 4           delete "lie" and insert --11e--
Line 26          delete "lie" and insert --11e--
Line 28          delete "lie" and insert --11e--

Signed and Sealed this
Eighth Day of November, 2022

Katherine Kelly Vidal
*Director of the United States Patent and Trademark Office*